United States Patent
Rysdyk

(10) Patent No.: US 10,775,809 B2
(45) Date of Patent: Sep. 15, 2020

(54) METHODS AND COMPUTING DEVICES FOR CONTROLLING AN AIRCRAFT AND/OR A VEHICLE TO ENABLE RETRIEVAL OF THE AIRCRAFT AT THE VEHICLE

(71) Applicant: Insitu, Inc., Bingen, WA (US)

(72) Inventor: Rolf Rysdyk, White Salmon, WA (US)

(73) Assignee: Insitu Inc., a Subsidiary of The Boeing Company, Bingen, WA (US)

( * ) Notice: Subject to any disclaimer, the term of this patent is extended or adjusted under 35 U.S.C. 154(b) by 204 days.

(21) Appl. No.: 15/948,980

(22) Filed: Apr. 9, 2018

(65) Prior Publication Data

US 2019/0310661 A1 Oct. 10, 2019

(51) Int. Cl.
| | |
|---|---|
| G05D 1/12 | (2006.01) |
| B64F 1/02 | (2006.01) |
| G01C 23/00 | (2006.01) |
| G05D 1/02 | (2020.01) |
| G05D 1/10 | (2006.01) |

(52) U.S. Cl.
CPC .............. G05D 1/12 (2013.01); B64F 1/02 (2013.01); G01C 23/00 (2013.01); G05D 1/0206 (2013.01); G05D 1/0276 (2013.01); G05D 1/101 (2013.01)

(58) Field of Classification Search
CPC ...... G05D 1/12; G05D 1/0206; G05D 1/0276; G05D 1/101; B64F 1/02; G01C 23/00
See application file for complete search history.

(56) References Cited

U.S. PATENT DOCUMENTS

| | | | | |
|---|---|---|---|---|
| 2011/0270472 | A1* | 11/2011 | Shafaat | G08G 5/0021 701/4 |
| 2014/0316616 | A1* | 10/2014 | Kugelmass | G08G 5/0013 701/8 |
| 2016/0152339 | A1* | 6/2016 | von Flotow | B64D 1/12 244/2 |
| 2017/0263131 | A1* | 9/2017 | Blomberg | G08G 5/0082 |
| 2018/0141526 | A1* | 5/2018 | Li | B60T 7/04 |
| 2018/0204398 | A1* | 7/2018 | Smith | G07C 5/0808 |

\* cited by examiner

*Primary Examiner* — Yazan A Soofi
*Assistant Examiner* — Naeem Taslim Alam
(74) *Attorney, Agent, or Firm* — McDonnell Boehnen Hulbert & Berghoff LLP

(57) ABSTRACT

Apparatus and methods for controlling an aircraft and/or a vehicle are described. A vehicle speed and direction are received. A wind-over-vehicle speed and direction of wind at the vehicle are measured. An aircraft ground speed and direction are received. An aircraft-relative-to-vehicle speed and an aircraft-relative-to-vehicle direction are calculated based on the aircraft ground speed and direction and the wind-over-vehicle speed and direction. A wind-over-vehicle envelope is calculated based on system design limits for retrieving the aircraft at the vehicle. The wind-over-vehicle envelope maps limits of wind-over-vehicle speeds over a range of directions that enable retrieval of the aircraft at the vehicle. The aircraft and/or the vehicle are controlled using the wind-over-vehicle envelope, the aircraft-relative-to-vehicle speed, and/or the aircraft-relative-to-vehicle direction.

20 Claims, 14 Drawing Sheets

METHODS AND COMPUTING DEVICES FOR CONTROLLING AN AIRCRAFT AND/OR A VEHICLE TO ENABLE RETRIEVAL OF THE AIRCRAFT AT THE VEHICLE

FIELD

The present disclosure generally relates to vehicle and aircraft navigation, and more particularly to methods and apparatus related to controlling an aircraft and/or a vehicle to enable retrieval of the aircraft at the vehicle.

BACKGROUND

Guidance, navigation, and control systems for aircraft include avionics on the aircraft and associated support systems. Guidance of the aircraft during aircraft takeoff, landing, and/or retrieval can be affected by wind and weather conditions, aircraft weight, aircraft payload, mission characteristics, and perhaps other conditions. Further, guidance of the aircraft during takeoff, landing, and/or retrieval at a vehicle, such as a ship or truck, can be complicated by vehicle-related conditions. Current techniques for addressing the complexity of guidance of the aircraft during takeoff, landing, and/or retrieval at a vehicle relate to the use of conservative guidelines at these times. Use of such conservative guidelines can make aircraft takeoff, landing, and/or retrieval unnecessarily difficult, particularly for small aircraft. What is needed are more accurate guidance techniques for guiding (small) aircraft at takeoff, landing, and/or retrieval, particularly when the aircraft take off, land, and/or are retrieved at a vehicle.

SUMMARY

In one example, a method for controlling an aircraft and/or a vehicle to enable retrieval of the aircraft at the vehicle is described. A vehicle speed of the vehicle and a vehicle direction of the vehicle are received. A wind-over-vehicle speed of wind at the vehicle and a wind-over-vehicle direction of wind at the vehicle are measured. An aircraft ground speed of the aircraft and an aircraft ground direction of the aircraft are received. An aircraft-relative-to-vehicle speed and an aircraft-relative-to-vehicle direction are calculated based on the aircraft ground speed, the aircraft ground direction, the wind-over-vehicle speed, and the wind-over-vehicle direction. One or more aircraft retrieval system design limits related to retrieving the aircraft at the vehicle are determined. A wind-over-vehicle envelope is calculated based on the one or more aircraft retrieval system design limits, the wind-over-vehicle envelope mapping limits of wind-over-vehicle speeds over a range of directions that enable retrieval of the aircraft at the vehicle. The aircraft and/or the vehicle are controlled to enable retrieval of the aircraft at the vehicle using the wind-over-vehicle envelope, the aircraft-relative-to-vehicle speed, and the aircraft-relative-to-vehicle direction.

In another example, a computing device is described. The computing device includes one or more processors and one or more non-transitory computer-readable media configured to store at least computer-readable instructions that, when executed by the one or more processors, causes the computing device to perform functions. The functions include: receiving a vehicle speed of the vehicle and a vehicle direction of the vehicle; measuring a wind-over-vehicle speed of wind at the vehicle and a wind-over-vehicle direction of wind at the vehicle; receiving an aircraft ground speed of the aircraft and an aircraft ground direction of the aircraft; calculating an aircraft-relative-to-vehicle speed and an aircraft-relative-to-vehicle direction based on the aircraft ground speed, the aircraft ground direction, the wind-over-vehicle speed, and the wind-over-vehicle direction; accounting for one or more aircraft retrieval system design limits related to retrieving the aircraft at the vehicle; calculating a wind-over-vehicle envelope based on the one or more aircraft retrieval system design limits, the wind-over-vehicle envelope mapping limits of wind-over-vehicle speeds over a range of directions that enable retrieval of the aircraft at the vehicle; and controlling the aircraft and/or the vehicle to enable retrieval of the aircraft at the vehicle using the wind-over-vehicle envelope, the aircraft-relative-to-vehicle speed, and the aircraft-relative-to-vehicle direction.

In still another example, a non-transitory computer readable medium is described. The non-transitory computer readable medium has stored thereon computer-readable instructions, that when executed by one or more processors of a computing device, cause the computing device to perform functions. The functions include: receiving a vehicle speed of the vehicle and a vehicle direction of the vehicle; measuring a wind-over-vehicle speed of wind at the vehicle and a wind-over-vehicle direction of wind at the vehicle; receiving an aircraft ground speed of the aircraft and an aircraft ground direction of the aircraft; calculating an aircraft-relative-to-vehicle speed and an aircraft-relative-to-vehicle direction based on the aircraft ground speed, the aircraft ground direction, the wind-over-vehicle speed, and the wind-over-vehicle direction; accounting for one or more aircraft retrieval system design limits related to retrieving the aircraft at the vehicle; calculating a wind-over-vehicle envelope based on the one or more aircraft retrieval system design limits, the wind-over-vehicle envelope mapping limits of wind-over-vehicle speeds over a range of directions that enable retrieval of the aircraft at the vehicle; and controlling the aircraft and/or the vehicle to enable retrieval of the aircraft at the vehicle using the wind-over-vehicle envelope, the aircraft-relative-to-vehicle speed, and the aircraft-relative-to-vehicle direction.

The features, functions, and advantages that have been discussed can be achieved independently in various embodiments or may be combined in yet other embodiments further details of which can be seen with reference to the following description and drawings.

DETAILED DESCRIPTION

Figure 1:
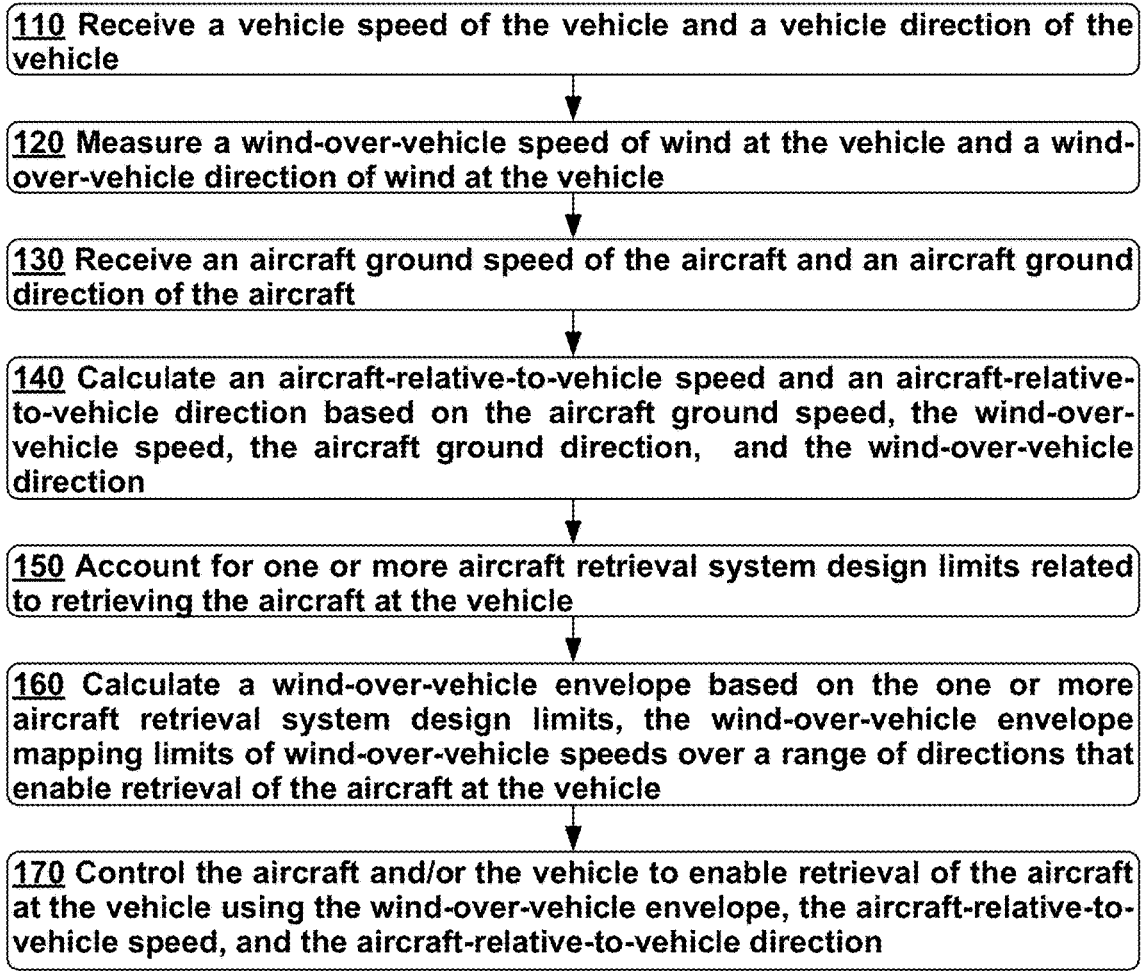
FIG. 1 is a flowchart of a method controlling an aircraft and/or a vehicle to enable retrieval of the aircraft at the vehicle, according to an example embodiment.

Herein described are methods and apparatus related to guiding an aircraft and/or a vehicle on an approach path for landing and/or otherwise retrieving the aircraft at the vehicle. In some examples, the vehicle can be in motion at when the aircraft is landing and/or being retrieved. The vehicle can be a ship, motor vehicle, another aircraft, and/or another mobile device. In some examples, the herein-described methods and apparatus can be used for guiding the aircraft and/or the vehicle during aircraft take off and/or during other navigational maneuvers.

The herein-described methods and apparatus can utilize a computing device. The computing device can receive and/or otherwise determine navigational data about the vehicle and/or the aircraft; e.g., vehicle navigational data such as a speed of the vehicle and/or a direction of travel of the vehicle, aircraft navigational data such as a ground speed of the aircraft and/or a ground direction of travel of the aircraft. The computing device can measure and/or otherwise determine wind speed and wind direction at the vehicle; e.g., the wind speed and wind direction can be measured at the vehicle (such as with an anemometer or other wind gauge) and resulting wind speed and wind direction data can be provided to the computing device. The computing device can calculate and/or otherwise determine a "wind-over-vehicle" direction based on the vehicle direction and the wind direction, where the wind-over-vehicle direction is a direction of wind adjusted for the vehicle's direction. The computing device can also calculate and/or otherwise determine a wind-over-vehicle speed based on the vehicle speed and the wind speed, where the wind-over-vehicle speed is a speed of wind adjusted for the vehicle's speed. For example, the wind-over-vehicle direction and/or speed can be a wind direction and/or speed at the vehicle relative to the vehicle's direction and/or speed.

The computing device can calculate and/or otherwise determine an aircraft-relative-to-vehicle direction and an aircraft-relative-to-vehicle speed based on the aircraft ground direction, the wind-over-vehicle direction, the aircraft ground speed, and the wind-over-vehicle speed, where the aircraft-relative-to-vehicle direction and aircraft-relative-to-vehicle speed respectively indicate the direction and speed of the aircraft's travel relative to the vehicle's direction and speed of travel. Then, a "crab angle", which is an angle between the aircraft ground direction and the aircraft-relative-to-vehicle direction, can be calculated and/or otherwise determined.

The computing device can receive, determine, and/or otherwise account for one or more aircraft retrieval system design limits related to retrieving the aircraft at the vehicle. Then, the computing device can calculate and/or otherwise determine a wind-over-vehicle envelope based on the one or more aircraft retrieval system design limits, where the wind-over-vehicle envelope can map limits of wind-over-vehicle speeds over a range of directions that enable retrieval of the aircraft at the vehicle. The wind-over-vehicle envelope can be displayed by the computing device; e.g., for an operator of the aircraft.

Then, the aircraft and/or the vehicle can be controlled to enable retrieval of the aircraft at the vehicle using the wind-over-vehicle envelope, the aircraft-relative-to-vehicle speed, and the aircraft-relative-to-vehicle direction. For example, the speed and direction of the aircraft can be adjusted to allow the aircraft to land or otherwise be retrieved at the vehicle based on the wind-over-vehicle envelope. As another example, an optimal approach speed for the aircraft can be calculated, perhaps based on a pre-defined approach angle for the aircraft. In yet another example, directions to control the vehicle can be provided using the wind-over-vehicle envelope.

Vector summation representations and associated algorithms can be used to determine the wind-over-vehicle envelope. For example, vectors that are based on speed and direction can be used; e.g., a wind velocity vector that is based on the wind speed and wind direction; an aircraft velocity vector that is based on the aircraft ground speed and the aircraft ground direction; a vehicle velocity vector that is based on the vehicle speed and vehicle direction.

The resulting wind-over-vehicle envelope can indicate maximum wind-over-vehicle speeds over a range of wind-over-vehicle directions. The wind-over-vehicle envelope can be used in aircraft approach and departure procedures, while taking vehicle conditions, aircraft conditions, environmental conditions, recovery and launch equipment limitations, and/or other conditions into account. Vehicle conditions can include, but are not limited to, vehicle direction, vehicle speed, vehicle course, and/or conditions on the vehicle imposed by a mission (e.g., the vehicle has to be at a pre-defined location at a pre-defined time as part of the mission). Aircraft conditions can include, but are not limited to, aircraft configuration, aircraft weight, aircraft ground speed, aircraft ground direction, crab angle, approach angle between the aircraft and the vehicle, minimum aircraft airspeed, maximum aircraft airspeed, and/or conditions on the vehicle imposed by a mission (e.g., the aircraft has to land on the vehicle at or before a pre-defined time as part of the mission). Environmental conditions include, but are not limited to, wind conditions (e.g., wind direction and speed), air temperature, and/or other environmental conditions (e.g., sea state, river state, terrain conditions, obstacles present in the environment, altitude). Recovery and launch equipment conditions include but are not limited to, minimum and/or maximum aircraft recovery speeds, minimum and/or maximum aircraft launch speeds, ranges of feasible directions for aircraft recovery based on recovery equipment and/or vehicle conditions, and/or ranges of feasible directions for aircraft launch based on recovery equipment. Other conditions can include, but are not limited to, other mission-based conditions, fuel/energy limitations on the vehicle and/or aircraft, and/or additional other weather conditions (e.g., a direction and/or speed of an oncoming storm; daylight or night-time hours, humidity, barometric pressure, dew point).

The computing device can use an algorithm for computing the wind-over-vehicle envelope. The algorithm can receive and/or otherwise determine, input conditions such as inputs related to vehicle conditions, aircraft conditions, environmental conditions, recovery and launch equipment limitations, and/or other conditions. The algorithm can use these input conditions to generate a wind-over-vehicle envelope that maps the input conditions as limitations of wind-over-vehicle speeds and directions. The algorithm can proceed by outputting the wind-over-vehicle envelope for display using a graphical user interface (GUI), commands for controlling the aircraft and/or the vehicle based on the wind-over-vehicle envelope, recommendations and/or other information for controlling the aircraft and/or the vehicle based on the wind-over-vehicle envelope. Then, perhaps after an operator decision, the algorithm can loop back to receiving and/or otherwise determining the input conditions in order to re-compute the wind-over-vehicle envelope.

The wind-over-vehicle envelope can provide an aircraft operator aboard the vehicle with an easy to interpret takeoff and landing diagram combining multiple limitations, reducing a number of pre-flight or pre-landing check list items. That is, the wind-over-vehicle envelope can transform complex aircraft and launch and recovery equipment design limitations into an easy to interpret diagram. The use of the wind-over-vehicle envelope can therefore beneficially reduce time to flight readiness, reduce operator workload during aircraft recovery, and reduce complexity of aircraft and/or vehicle launch and recovery considerations for the operator.

Using the wind-over-vehicle envelope can save time when landing and/or retrieving aircraft and can provide more accurate and, in some cases, less conservative guidance for aircraft and vehicle control. Providing less conservative guidance advantageously can enable aircraft to take off, land, and/or be retrieved under conditions considered to be unsuitable under more conservative guidance, thereby increasing mission readiness and mission success. Further, use of a simple, easily readable wind-over-vehicle envelope can save time and effort for an operator of the aircraft and/or a related vehicle during takeoff, landing, and/or retrieval of the aircraft.

FIG. 1 is a flowchart of method 100 for controlling an aircraft and/or a vehicle to enable retrieval of the aircraft at the vehicle, according to an example embodiment. Method 100 is executable by a computing device, such as computing device 200 described below in the context of FIG. 2.

Figure 4:
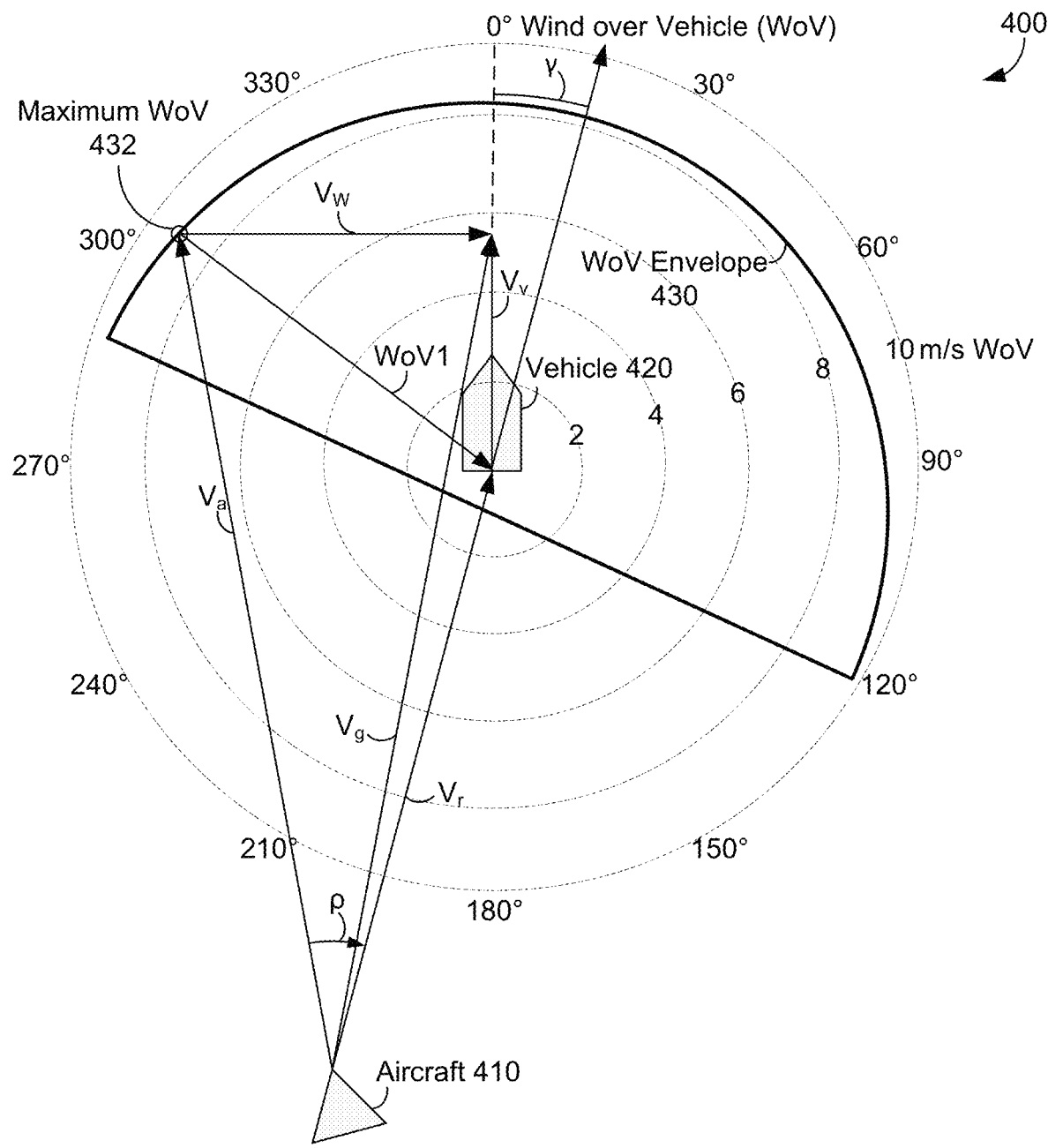
FIG. 4 shows a wind-over-vehicle (WoV) envelope associated with an aircraft and a vehicle, according to an example embodiment.
Figure 5:
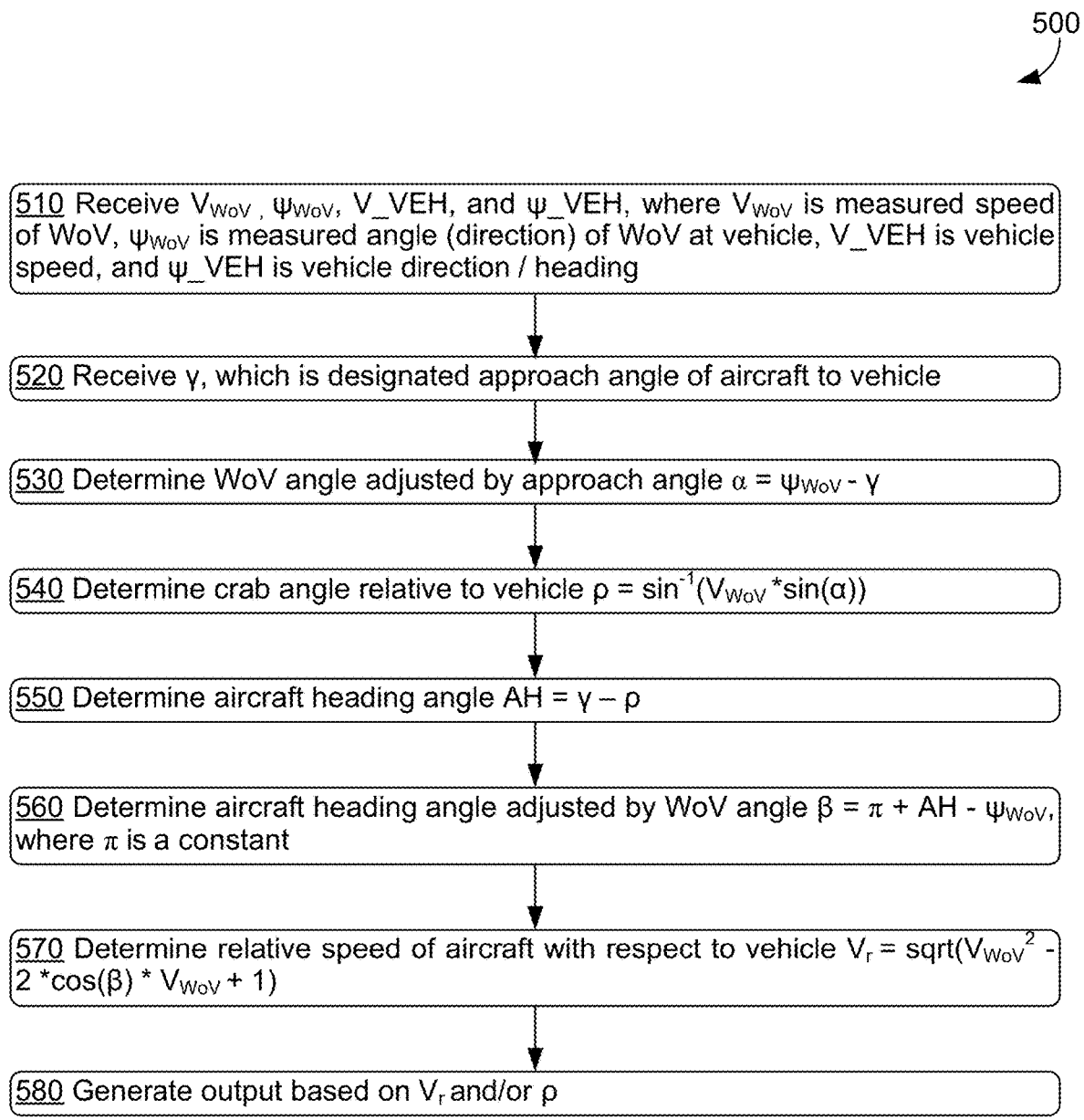
FIG. 5 is a flowchart of a method related to providing an output based on a crab angle and/or a relative speed of an aircraft with respect to a vehicle, according to an example embodiment.

Method 100 begins at block 110 of FIG. 1, where the computing device can receive a vehicle speed of the vehicle and a vehicle direction of the vehicle, such as discussed herein in the context at least of FIGS. 4 and 5.

Figure 7:
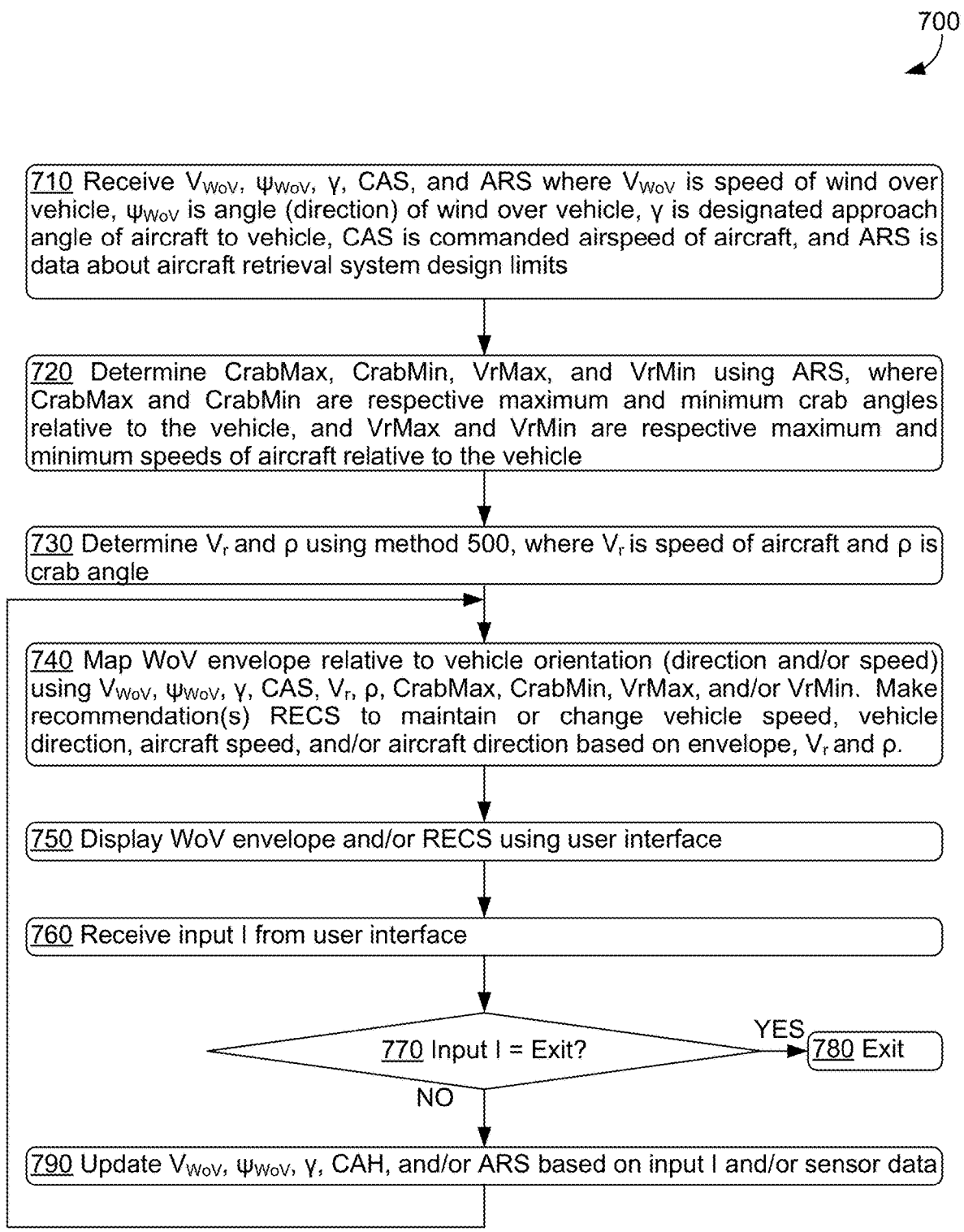
FIG. 7 is a method related to providing a wind-over-vehicle envelope using a user interface, according to an example embodiment.

At block 120, the computing device can measure a wind-over-vehicle speed of wind at the vehicle and a wind-over-vehicle direction of wind at the vehicle, such as discussed herein in the context at least of FIGS. 4, 5, and 7.

Figure 6:
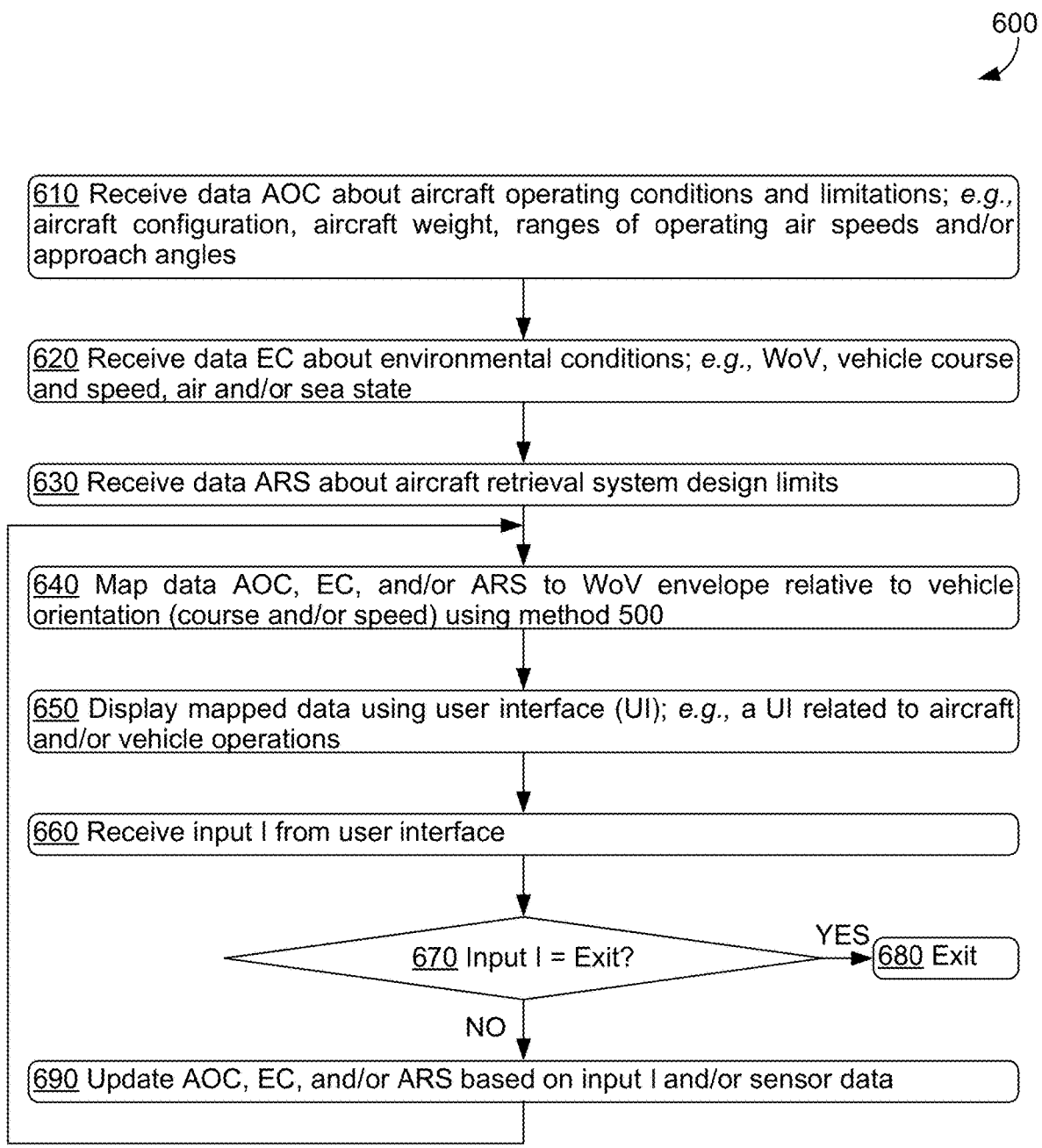
FIG. 6 is a method related to providing mapped data using a user interface, according to an example embodiment.

At block 130, the computing device can receive an aircraft ground speed of the aircraft and an aircraft ground direction of the aircraft, such as discussed herein in the context at least of FIGS. 4 and 6.

At block 140, the computing device can calculate an aircraft-relative-to-vehicle speed and an aircraft-relative-to-vehicle direction based on the aircraft ground speed, the aircraft ground direction, the wind-over-vehicle speed, and the wind-over-vehicle direction, such as discussed herein in the context at least of FIGS. 4 and 5.

At block 150, the computing device can account for one or more aircraft retrieval system design limits related to retrieving the aircraft at the vehicle, such as discussed herein in the context at least of FIGS. 6 and 7.

At block 160, the computing device can calculate a wind-over-vehicle envelope based on the one or more aircraft retrieval system design limits, the wind-over-vehicle envelope mapping limits of wind-over-vehicle speeds over a range of directions that enable retrieval of the aircraft at the vehicle, such as discussed herein in the context at least of FIGS. 4, 6, and 7.

At block 170, the computing device can control the aircraft and/or the vehicle to enable retrieval of the aircraft at the vehicle using the wind-over-vehicle envelope, the aircraft-relative-to-vehicle speed, and the aircraft-relative-to-vehicle direction, such as discussed herein in the context at least of FIGS. 3A, 3B, 6, 7, 11, and 13. In some examples, the vehicle can include an aircraft retrieval system; then, controlling the aircraft and/or the vehicle to enable retrieval of the aircraft at the vehicle can include controlling the aircraft and/or the vehicle to enable retrieval of the aircraft at the vehicle using the aircraft retrieval system, such as discussed herein in the context at least of FIGS. 3A and 3B. In some of these examples, controlling the aircraft and/or the vehicle to enable retrieval of the aircraft at the vehicle using the aircraft retrieval system can include: directing the aircraft to fly towards the aircraft-relative-to-vehicle direction and near the aircraft-relative-to-vehicle speed until reaching the vehicle; and when the aircraft reaches the vehicle, retrieving the aircraft using the aircraft retrieval system, such as discussed herein in the context at least of FIGS. 3A and 3B. In other of these examples, the aircraft retrieval system can include an elongated member and/or a net; then, retrieving the aircraft using the aircraft retrieval system can include retrieving the aircraft using the elongated member and/or the net of the aircraft retrieval system, such as discussed herein in the context at least of FIGS. 3A and 3B. In even other of these examples, the aircraft can include a hook; then, retrieving the aircraft using the elongated member and/or the net of the aircraft retrieval system includes retrieving the aircraft using the elongated member and/or the net of the aircraft retrieval system and the hook, such as discussed herein in the context at least of FIGS. 3A and 3B.

In other examples, controlling the aircraft and/or the vehicle to enable retrieval of the aircraft at the vehicle can include: controlling the aircraft ground speed of the aircraft and/or the aircraft ground direction of the aircraft; and/or controlling the vehicle speed of the vehicle and/or the vehicle direction of the vehicle, such as discussed herein in the context at least of FIGS. 6, 7, 11, and 13. In even other examples, controlling the aircraft and/or the vehicle to enable retrieval of the aircraft at the vehicle can include: determining a minimum wind-over-vehicle speed and a maximum wind-over-vehicle speed at the aircraft-relative-to-vehicle direction using the wind-over-vehicle envelope; determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the aircraft-relative-to-vehicle speed and the aircraft-relative-to-vehicle direction of the aircraft, such as discussed herein in the context at least of FIGS. 6, 7, and 12.

Figure 12:
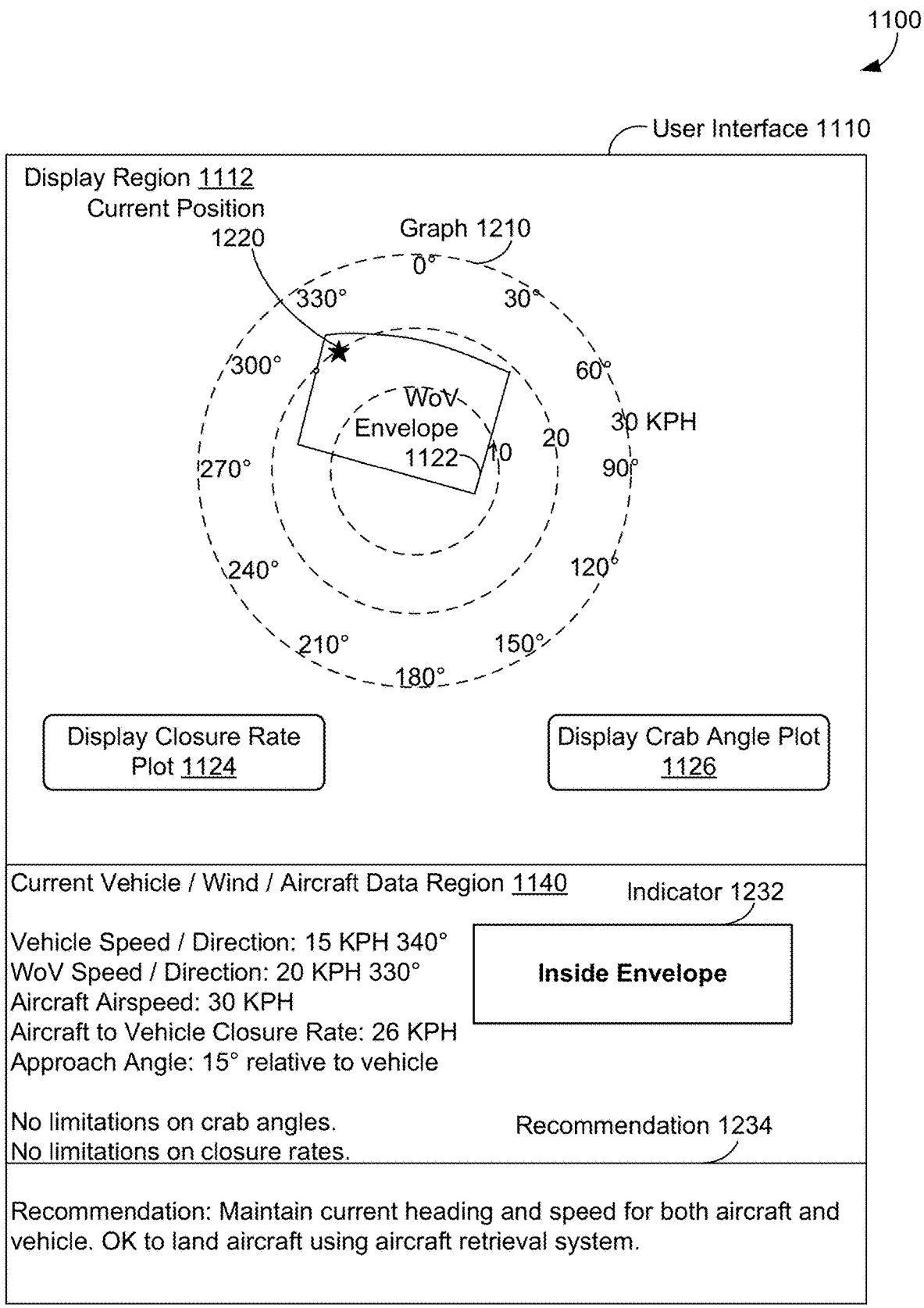
Figure 13:
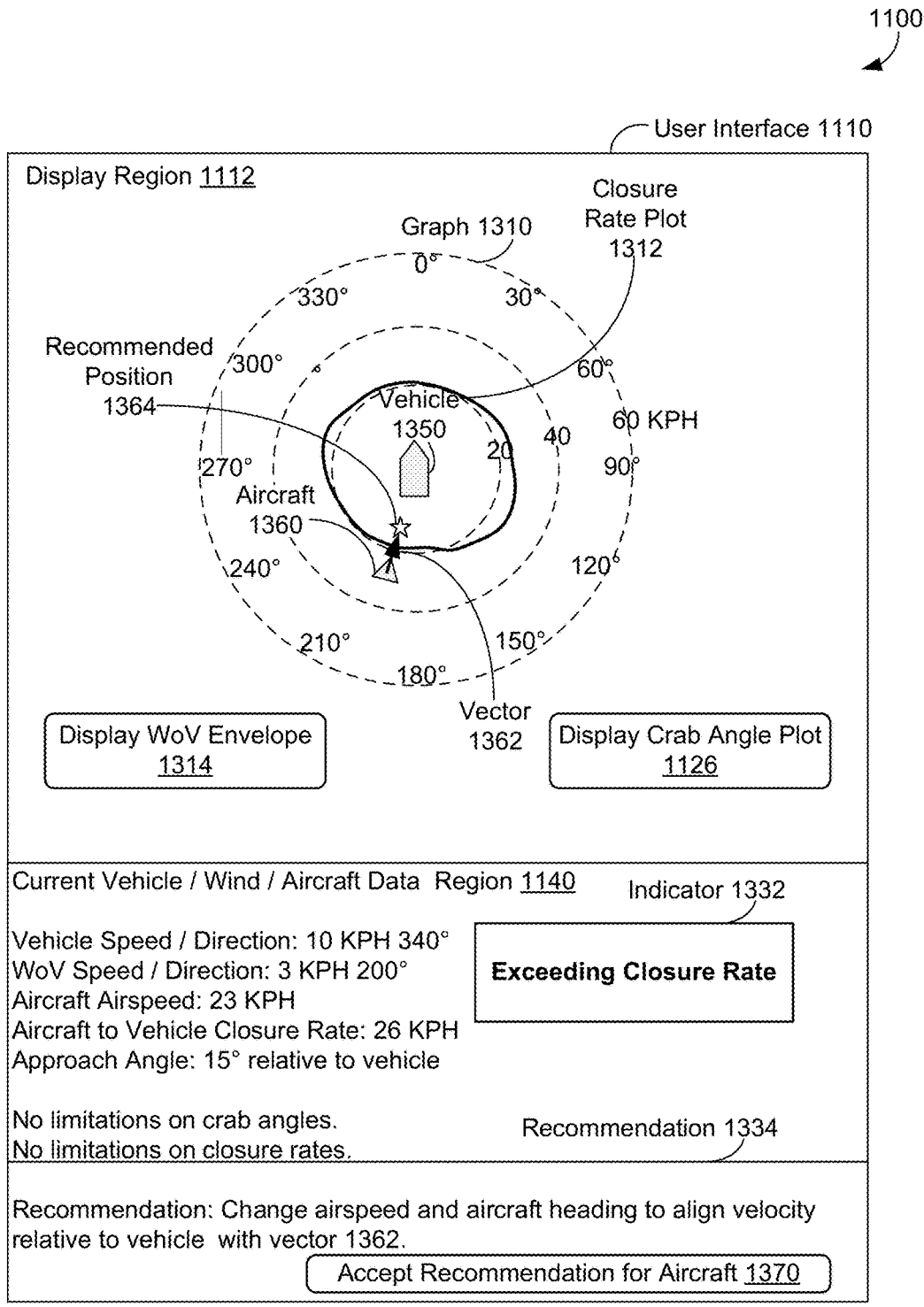

In still other examples, controlling the aircraft and/or the vehicle to enable retrieval of the aircraft at the vehicle can include: determining a minimum wind-over-vehicle speed and a maximum wind-over-vehicle speed at the aircraft-relative-to-vehicle direction using the wind-over-vehicle envelope; determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum windover-vehicle speed, providing a command to the aircraft that changes the aircraft-relative-to-vehicle speed of the aircraft and/or the aircraft-relative-to-vehicle direction of the aircraft, such as discussed herein in the context at least of FIGS. 6, 7, and 13. In yet other examples, controlling the aircraft and/or the vehicle to enable retrieval of the aircraft at the vehicle can include: determining a minimum wind-over-vehicle speed and a maximum wind-over-vehicle speed at the aircraft-relative-to-vehicle direction using the wind-over-vehicle envelope; determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the vehicle speed and the vehicle direction of the vehicle, such as discussed herein in the context at least of FIGS. 6, 7, and 12.

Figure 11:
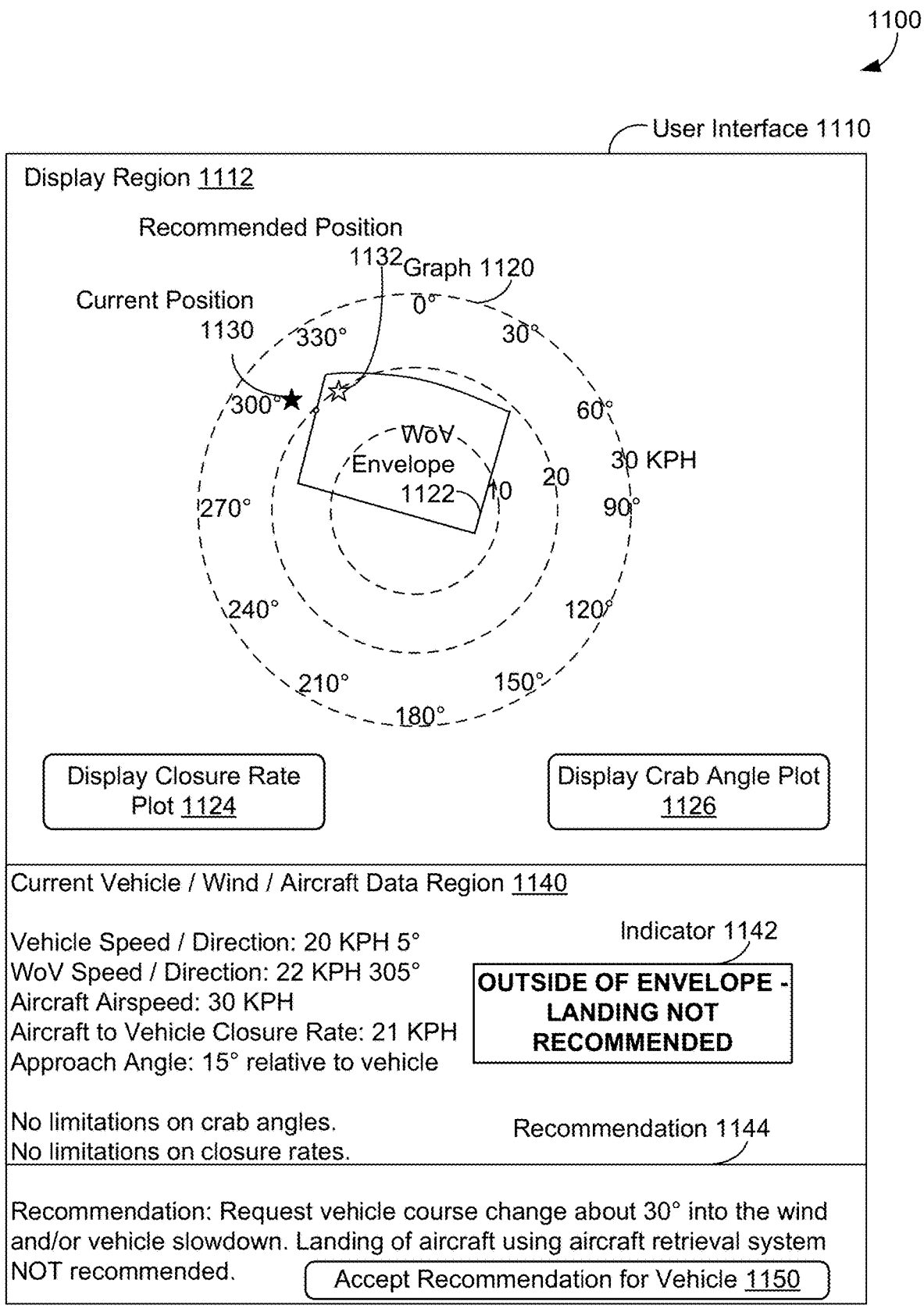
FIGS. 11, 12, and 13 illustrate a scenario utilizing a user interface related to aircraft and/or vehicle operations, according to an example embodiment.

In further other examples, controlling the aircraft and/or the vehicle to enable retrieval of the aircraft at the vehicle can include: determining a minimum wind-over-vehicle speed and a maximum wind-over-vehicle speed at the aircraft-relative-to-vehicle direction using the wind-over-vehicle envelope; determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum wind-over-vehicle speed, changing the vehicle speed of the vehicle and the vehicle direction of the vehicle, such as discussed herein in the context at least of FIGS. 6, 7, and 11.

In some examples, method 100 can further include: providing an output of a computing device, the output including one or more of: an image of the wind-over-vehicle envelope, an image of a crab angle plot of crab angles and wind-over-vehicle directions, or an image of a closure rate plot of a closure rate between the aircraft and the vehicle, such as discussed herein in the context at least of FIGS. 4-13.

Figure 3A:
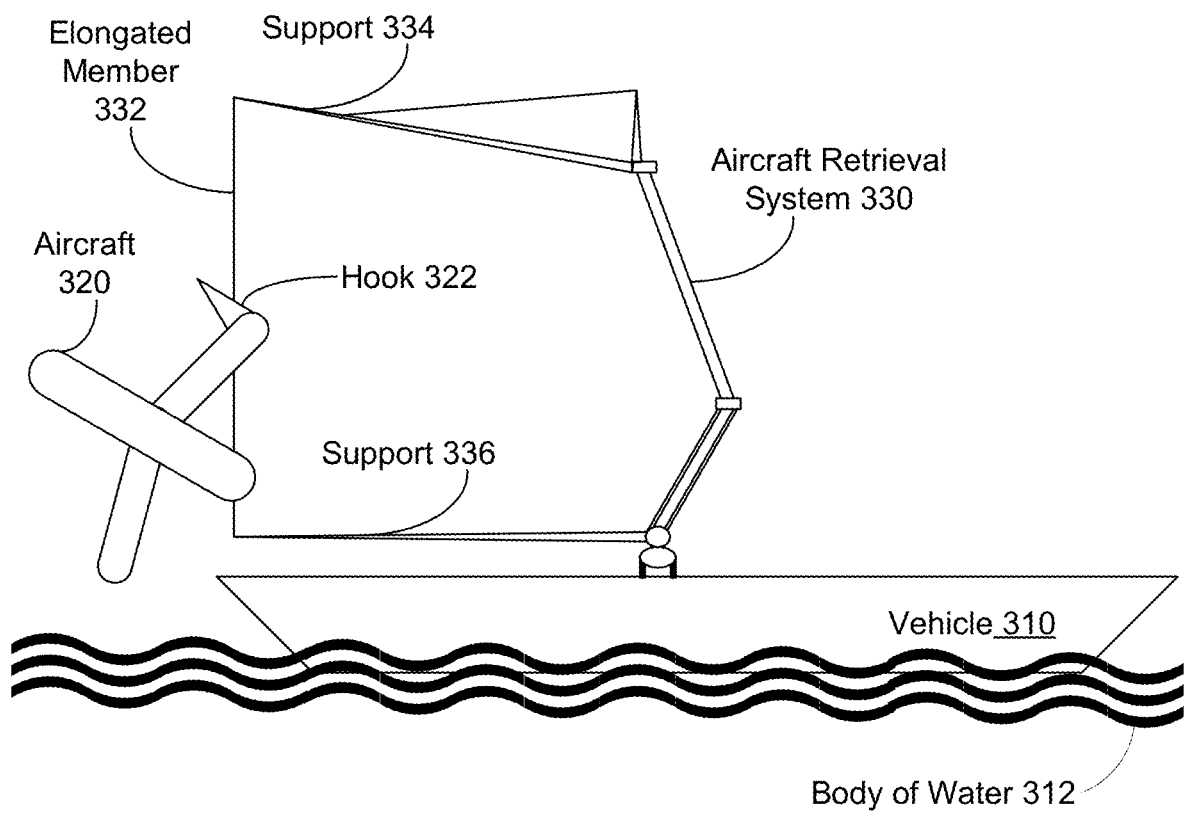
FIG. 3A depicts aircraft retrieval on a body of water, according to an example embodiment.
Figure 3B:
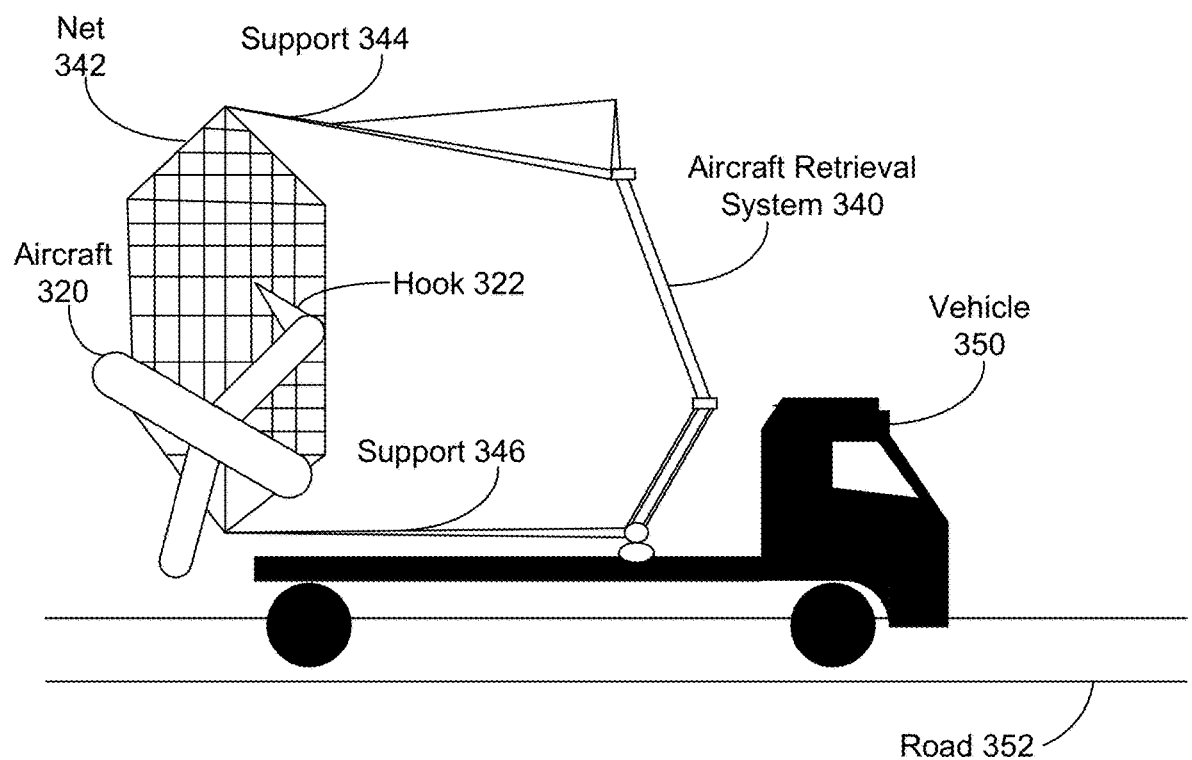
FIG. 3B depicts aircraft retrieval on a road, according to an example embodiment.

In other examples, method 100 can further include: utilizing the vehicle on a body of water, such as discussed herein in the context at least of FIGS. 3A and 3B. In even other examples, method 100 can further include: utilizing the vehicle on a road, such as discussed herein in the context at least of FIGS. 3A and 3B.

Figure 2:
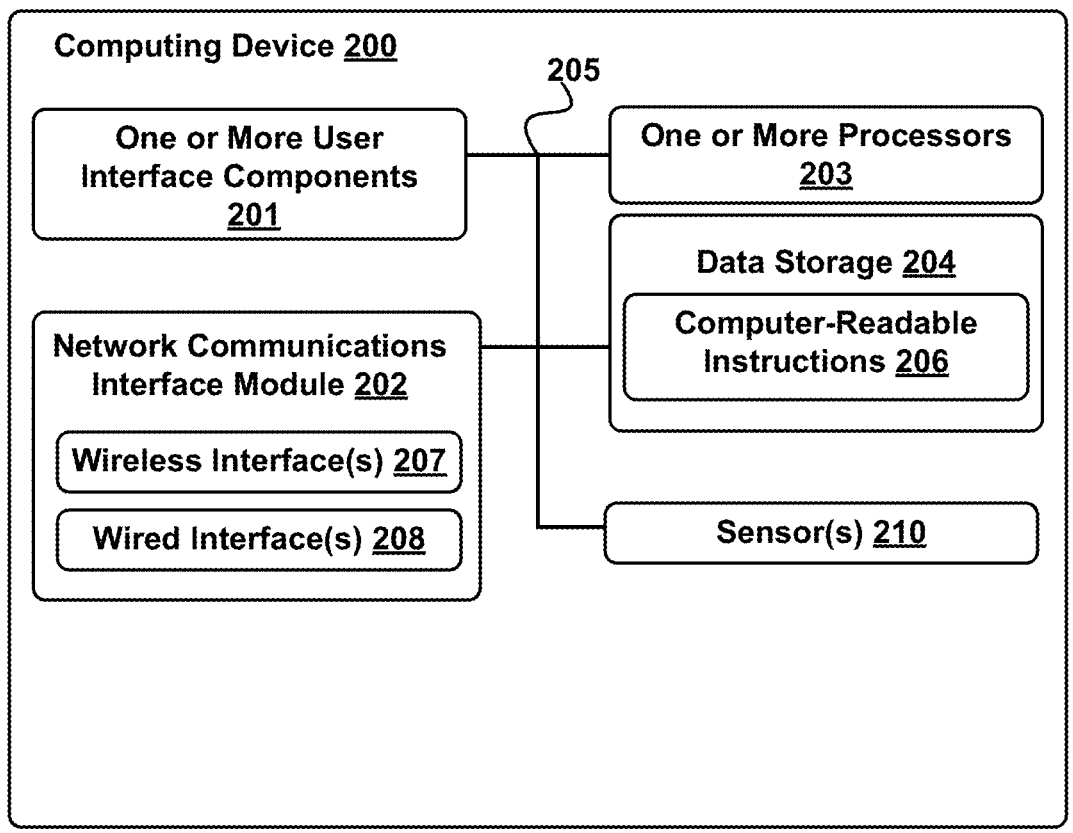
FIG. 2 is a block diagram of a computing device, according to an example embodiment.

FIG. 2 is a block diagram of computing device 200, according to an example embodiment. Computing device 200 includes one or more user interface components 201, network-communication interface module 202, one or more processors 203, data storage 204, and sensor(s) 210, all of which may be linked together via a system bus, network, or other connection mechanism 205, in accordance with an example embodiment. In particular, computing device 200 can perform some or all of the herein-described functionality related to one or more of: methods 100, 500, 600, 700, vehicle 310, 350, aircraft 320, diagrams 400, 800, 900, 1000, scenario 1100, user interface 1110, a computing device, an aircraft, a vehicle, a wind-over-vehicle envelope, a crab angle plot, and/or a closure rate plot. In some embodiments, computing device 200 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods.

User interface component(s) 201 can include one or more components that can receive input and/or provide output, perhaps to a user. User interface component(s) 201 can include one or more components configured to send and/or receive data to and/or from a user and/or other entities; such components can include but are not limited to: a keyboard, a keypad, a touch screen, a touch pad, a computer mouse, a track ball, a joystick, a game controller, button and/or other similar devices configured to receive user input from a user of and/or other entities associated with the computing device 200. User interface component(s) 201 can include one or more components configured to display visual outputs; such components can include but are not limited to: but are not limited to: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface component(s) 201 can also include one or more components to generate audible output(s); such components can include but are not limited to: a speaker, speaker jack, audio output port, audio output device, earphones, and/or other similar devices configured to generate audible output(s) and/or convey sound and/or audible information; e.g., to a user of computing device 200.

Network-communication interface module 202 can be configured to send and receive data over one or more wireless interfaces 207 and/or one or more wired interfaces 208 via a data or other communications network. Wireless interface(s) 207, if present, can utilize an air interface, such as a Bluetooth®, ZigBee®, Wi-Fi™, and/or WiMAX™ interface to a data network, such as a wide area network (WAN), a local area network (LAN), one or more public data networks (e.g., the Internet), one or more private data networks, or any combination of public and private data networks. Wired interface(s) 208, if present, can comprise a wire, cable, fiber-optic link and/or similar physical connection to a data network, such as a WAN, a LAN, one or more public data networks, such as the Internet, one or more private data networks, or any combination of such networks.

In some embodiments, network-communication interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processor(s) 203 includes one or more central processing units, computer processors, mobile processors, digital signal processors (DSPs), graphics processing units (GPUs), microprocessors, computer chips, programmable processors, multi-core processors, and/or other processing units configured to execute machine-language instructions and process data. Processor(s) 203 can be configured to execute computer-readable program instructions 206 that are contained in data storage 204 and/or other instructions as described herein.

Data storage 204 includes one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 204 can include one or more physical and/or non-transitory storage devices with at least enough combined storage capacity to contain computer-readable program instructions 206 and any associated/related data structures. In some embodiments, some or all of data storage 204 can be removable, such as a removable hard drive, removable disk, or flash memory.

Computer-readable program instructions 206 and any data structures contained in data storage 204 include computer-readable program instructions executable by processor(s) 203 and any storage required, respectively, to perform at least part of the herein-described functionality of a computing device. For example, data storage 204 can also store data used to perform at least part of the herein-described functionality of a computing device. Computer-readable program instructions 206 can include instructions that when executed by processor(s) 203 to perform functions, including but not limited to herein-described functionality of software, displays, and/or user interfaces.

In some embodiments, computing device 200 includes one or more sensors 210. Sensor(s) 210 can be configured to measure conditions in an environment around computing device 200 and provide data about the measured conditions of the environment. The data can include, but are not limited to: meteorological conditions including, but not limited to, wind speed, wind direction, temperature, humidity, barometric pressure, and/or rainfall; location data about computing device 200 including, but not limited to, latitude, longitude, and/or altitude data; kinematic information (e.g., location, speed, velocity, acceleration data) related to computing device 200, one or more vehicles, and/or one or more aircraft, and electromagnetic radiation data (e.g., infra-red, ultra-violet, X-ray data). The one or more sensors 210 can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, wind sensors, barometers, rain gauges, and microphones. Other examples of sensor(s) 210 are possible as well.

In some examples, sensors 210 can be utilized for relative position sensing, where relative position sensing provides information about aircraft velocity relative to a vehicle; e.g., using differential GPS and/or radio-based triangulation methods. In particular of these examples computing device 200 and sensors 210 can provide and use relative position sensing in order to automate features related to aircraft guidance, vehicle guidance, and/or aircraft retrieval.

Other components shown in FIG. 2 can be varied from the illustrative examples shown. Generally, the different embodiments can be implemented using any hardware device or system capable of running program code.

FIG. 3A depicts aircraft retrieval on a body of water, according to an example embodiment. In particular, FIG. 3A depicts vehicle 310 on body of water 312; e.g., vehicle 310 is a ship, boat, or another other vehicle that can travel on body of water 312 with aircraft retrieval system 330. Vehicle 310 includes aircraft retrieval system 330 that can be used to retrieve an aircraft, such as aircraft 320, from the air, thereby effectively landing aircraft 320 at vehicle 310. In some examples, aircraft 320 can be an unmanned aircraft; e.g., an unmanned aerial vehicle (UAV) or drone.

FIG. 3A shows that aircraft 320 can include hook 322 and aircraft retrieval system 330 can include elongated member 332 supported between an upper support 334 and a lower support 336. In the example shown in FIG. 3A, elongated member 332 is a rope—in other examples, elongated member 332 can be a flexible pole or other similar member.

In the example shown in FIG. 3A, aircraft 320 has been retrieved at vehicle 310 by catching hook 322 in elongated member 332. In particular, aircraft 320 can be controlled to fly on a course so that aircraft 320 catches onto elongated member 332 of aircraft retrieval system 330; e.g., by catching hook 322 with elongated member 332. Once aircraft 320 is caught by aircraft retrieval system 330, aircraft 320 can be powered down, removed from aircraft retrieval system 330, and placed on vehicle 310, thereby landing aircraft 320 at vehicle 310.

FIG. 3B depicts aircraft retrieval on a road, according to an example embodiment. In particular, FIG. 3B depicts vehicle 350 on road 352; e.g., vehicle 350 is a truck or other motor vehicle that can travel on road 352 with aircraft retrieval system 330. In some cases, vehicle 350 travels off-road with aircraft retrieval system 330. Vehicle 350 includes aircraft retrieval system 340 that can be used to retrieve an aircraft, such as aircraft 320, from the air, thereby effectively landing aircraft 320 at vehicle 350. FIG. 3B shows that aircraft retrieval system 340 is similar to aircraft retrieval system 330 of FIG. 3A. However, where supports 334 and 336 of aircraft retrieval system 330 support elongated member 332, corresponding supports 344 and 346 of aircraft retrieval system 330 support net 342.

In the example shown in FIG. 3B, aircraft 320 has been retrieved at vehicle 350 by catching hook 322 in net 342. In particular, aircraft 320 can be controlled to fly on a course so that net 342 of aircraft retrieval system 340 catches aircraft 320; e.g., by catching hook 322 in net 342. Once aircraft 320 is caught by aircraft retrieval system 340, aircraft 320 can be powered down, removed from aircraft retrieval system 340, and placed on vehicle 310, thereby landing aircraft 320 at vehicle 350.

In some examples, aircraft retrieval system 330 is mounted on a land-based vehicle, such as vehicle 350; and/or aircraft retrieval system 340 is mounted on a water-based vehicle, such as vehicle 310. In other examples, aircraft retrieval system 330 and/or aircraft retrieval system 340 can be mounted on an air-based vehicle, such as an aircraft or other aerial platform that is larger than aircraft 320. In other examples, aircraft retrieval system 330 and/or aircraft retrieval system 340 are located at a fixed location; e.g., on the ground.

In other examples, aircraft retrieval can be performed using variations of the retrieval techniques discussed in the context of aircraft retrieval systems 330 and 340. For example, hook 322 can be a "tail hook" mounted at a rear or "tail" portion of aircraft 320, and retrieval of aircraft 320 can involve capture of aircraft 320 by catching the tail hook using a vertical elongated member such as elongated member 332 or using a horizontal elongated member; e.g., a rope or wire stretched across a deck, flat bed, or other surface of vehicle 310 or vehicle 350. As another example, net 342 can be mounted horizontally, rather than vertically, as shown in FIG. 3B. As such, the aircraft can then fly into the horizontally-mounted net, perhaps after or at the same time as powering down. Other variations for performing aircraft retrieval using aircraft retrieval systems 330 and 340 are possible as well.

FIG. 4 shows diagram 400 with wind-over-vehicle envelope 430 associated with aircraft 410 and vehicle 420, according to an example embodiment. Table 1, which is partially reproduced as a Legend in FIG. 4 below provides information about the depicted wind-over-vehicle envelope and related vectors.

TABLE 1

| Symbol | Meaning | Scalar/Vector Information |
|---|---|---|
| γ | Designated approach angle of aircraft 410 to vehicle 420 | Scalar value |
| $V_W$ | Wind velocity | Vector value; $V_W$ can have two components: wind speed and wind direction |
| $V_V$ | Velocity of vehicle 420 | Vector value; $V_V$ can have two components: vehicle speed and vehicle direction |
| WoV1 | Wind-over-vehicle velocity = wind velocity relative to vehicle 420 | Vector value; WoV1 can have two components: wind-over-vehicle speed and wind-over-vehicle direction |
| $V_a$ | Air velocity of aircraft 410 | Vector value; $V_a$ can have two components: aircraft air speed and aircraft air direction |
| $V_g$ | Ground Velocity of aircraft 410 | Vector value; $V_g$ can have two components: aircraft ground speed and aircraft ground direction |
| $V_r$ | Velocity of aircraft 410 relative to vehicle 420 | Vector value; $V_r$ can have two components: aircraft-relative-to-vehicle speed and aircraft-relative-to-vehicle direction |
| ρ | Crab angle relative to vehicle 420 - the crab angle represents adjustment by aircraft for wind/vehicle 420 motion | Scalar value |

A computing device at vehicle 420 can receive or otherwise determine information about vehicle speed and vehicle direction of vehicle 420 at a time T to form vector $V_V$. For example, $V_V$ (and other vectors described herein) can be expressed using polar notation, where the magnitude of $V_V$ is the vehicle speed and the angle of $V_V$ is the vehicle direction. The computing device can then measure; e.g., using a wind sensor, or otherwise determine information about a wind-over-vehicle speed and a wind-over-vehicle direction of wind at vehicle 420 at time T and then use the wind-over-vehicle speed and the wind-over-vehicle direction to form vector WoV1. Then, the computing device can determine a vector $V_W$ representing wind velocity by performing vector subtraction; that is, $V_W = WoV1 - V_V$.

The computing device can receive or otherwise determine information about aircraft ground speed and aircraft ground direction of aircraft 410 at a time T to form vector $V_g$ representing aircraft ground velocity. For example, the computing device and/or other devices on vehicle 420 can be used to control aircraft 410 by specifying aircraft ground speed, aircraft ground direction, and/or vector $V_g$ at time T and communicating a command to aircraft 410 to fly according to the specified aircraft ground speed, aircraft ground direction, and/or vector $V_a$ to aircraft 410. As another example, information about aircraft ground speed and aircraft ground direction can be provided by GPS and/or relative position sensing. As another example, aircraft 410 can send information that includes aircraft ground speed and aircraft ground direction to the computing device; then, the computing device can form vector $V_g$ using the received aircraft ground speed and aircraft ground direction.

In some cases, the computing device can receive or otherwise determine information about aircraft air speed and aircraft air direction of aircraft 410 at a time T to form vector $V_a$ representing aircraft air velocity. The computing device can then use vectors $V_a$ and WoV1 to form vector $V_r$. For example, the computing device can have sensors or other devices that measure air speed and air direction of aircraft 410. As another example, aircraft 410 can send information that includes aircraft air speed and aircraft air direction to the computing device; then, the computing device can form vector $V_a$ using the received aircraft ground speed and aircraft ground direction. Then, the computing device can use vector $V_a$ to determine vector $V_r$ by performing vector addition; that is, $V_r = V_a + WoV1$.

In some examples, computing device can determine vector $V_r$ representing motion of aircraft 410 relative to vehicle 420 using vectors $V_g$ and $V_V$. For example, $V_r$ can be determined by performing vector subtraction; that is, $V_r = V_g - V_V$.

The computing device can also calculate a scalar crab angle ρ as a difference in directions between vectors $V_a$ and $V_r$. Further, the computing device can also calculate a scalar approach angle γ as the difference in directions between vectors $V_g$ and $V_r$.

Wind-over-vehicle envelope 430 represents ranges of minimum and maximum wind-over-vehicle speeds and directions where aircraft 410 can be safely retrieved and/or landed on vehicle 420; i.e., using aircraft retrieval system 330 or aircraft retrieval system 340. For example, FIG. 4 shows that vector VoW1 touches wind-over-vehicle envelope 430. As vector VoW1 touches wind-over-vehicle envelope 430, vector VoW1 represents a maximum wind-over-vehicle velocity for retrieving and/or landing aircraft 410 on vehicle 420. If vector VoW1 extended outside of wind-over-vehicle envelope 430, then the corresponding wind-over-vehicle would be too high to safely retrieve and/or land aircraft 410 on vehicle 420. If vector VoW1 ended within wind-over-vehicle envelope 430, then the corresponding wind-over-vehicle would allow safe retrieval and/or landing of aircraft 410 on vehicle 420.

In particular, vector VoW1 touches wind-over-vehicle envelope 430 at a point corresponding to maximum wind-over-vehicle 432. Maximum wind-over-vehicle 432 represents a maximum wind-over-vehicle speed of approximately 9 meters per second (m/s) at an aircraft approach direction of approximately 307 degrees. As vector VoW1 represents a wind-over-vehicle speed of approximately 9 meters per second at an aircraft approach direction of approximately 307 degrees at time T, wind-over-vehicle envelope 430 and vector VoW1 indicate that aircraft 410 can be safely retrieved and/or landed at vehicle 420 under conditions prevailing at vehicle 420 at time T.

FIG. 5 is a flowchart of method 500 related to providing an output, such as a display, based on crab angle ρ and/or a relative speed of an aircraft with respect to a vehicle $V_r$ given wind-over-vehicle information, vehicle velocity information, and approach angle information, vehicle v according to an example embodiment. Method 500 is executable by a computing device, such as computing device 200 described above in the context of FIG. 2.

Method 500 begins at block 510, where the computing device can receive $V_{WoV}$, $\psi_{WoV}$, V_VEH, and $\psi$_VEH, where:

$V_{WoV}$ is a wind-over-vehicle speed of wind over a vehicle; e.g., wind speed as measured at the vehicle, $\psi_{WoV}$ is a wind-over-vehicle angle or direction of the wind over the vehicle; e.g., wind angle or direction as measured at the vehicle, V_VEH is a speed of the vehicle, and $\psi$_VEH is a heading or direction of the vehicle.

For example, $V_{WoV}$ and $\psi_{WoV}$ can be collectively considered as wind-over-vehicle information, and V_VEH and $\psi$_VEH can be collectively considered vehicle velocity information.

At block 520, the computing device can receive γ, which is a designated approach angle of an aircraft to the vehicle. For example, γ can be considered as approach angle information.

At block 530, the computing device can calculate and/or determine α, which is a wind-over-vehicle angle adjusted by the designated approach angle, using Equation (1):

$$\alpha = \psi_{WoV} - \gamma \quad (1)$$

At block 540, the computing device can calculate and/or determine ρ, which is an aircraft crab angle relative to the vehicle, using Equation (2):

$$\rho = \sin^{-1}(V_{WoV} * \sin(\alpha)) \quad (2)$$

At block 550, the computing device can calculate and/or determine AH, which is an aircraft heading angle, using Equation (3):

$$AH = \gamma - \rho \quad (3)$$

At block 560, the computing device can calculate and/or determine β, which is an aircraft heading angle adjusted by the wind-over-vehicle angle, using Equation (4):

$$\beta = \pi + AH - \psi_{WoV} \quad (4)$$

At block 570, the computing device can calculate and/or determine $V_r$, which is a relative speed of the aircraft with respect to the vehicle, using Equation (5):

$$V_r = \sqrt{(V_{WoV}^2 - 2*V_{WoV}*\cos(\beta)+1)} \quad (5)$$

At block 580, the computing device can generate an output based on the relative speed of the aircraft with respect to the vehicle $V_r$ and/or the aircraft crab angle relative to the vehicle ρ. For example outputs, the computing device can display and/or otherwise present: $V_r$ and/or ρ in alphanumeric form, a wind-over-vehicle envelope that has been determined using $V_r$ and/or ρ, a user interface that includes $V_r$, ρ, and/or information derived from $V_r$ and/or ρ. Other outputs are possible as well.

FIG. 6 is a flowchart of method 600, which is related to providing mapped data using a user interface, according to an example embodiment. Method 600 is executable by a computing device, such as computing device 200 described above in the context of FIG. 2.

Method 600 begins at block 610, where the computing device can receive data AOC, where AOC stands for aircraft operating conditions. Data AOC can include, but is not limited to, data about: an aircraft, aircraft operating conditions, aircraft operating limitations, and/or aircraft configuration; e.g., aircraft 320. For example, data AOC can include data about: aircraft dimensions, maximum and/or minimum aircraft weight, maximum and/or minimum speed, aircraft ceiling information, aircraft engine information, ranges of operating air speeds and/or approach angles for the aircraft, information about aircraft retrieval/landing equipment, aircraft configuration information, aircraft, meteorological and/or other environment information for an environment where the aircraft is operating, aircraft payload, aircraft sensors, aircraft fueling and/or battery information, and/or aircraft communication information.

At block 620, the computing device can receive data EC, where EC stands for environmental conditions. Data EC can include, but is not limited to, data: about: wind including a wind over a vehicle, vehicle course and speed, air state, sea state, and/or meteorological and/or other environment information for an environment. In some examples, some or all of data EC about environmental conditions can also, or instead, be provided as data AOC mentioned above with regards to block 610; e.g., meteorological and/or other environment information for an environment where an aircraft is operating.

At block 630, the computing device can receive data ARS, where ARS stands for aircraft retrieval system. Data ARS can be about one or more design limits about one or more aircraft retrieval systems; e.g., aircraft retrieval system 340. Data ARS can include, but is not limited to data about: one or more configurations of the one or more aircraft retrieval systems, dimensions about the one or more aircraft retrieval systems, and/or maximum and/or minimum aircraft speed and/or other information at a time of aircraft retrieval by the aircraft retrieval system(s). In some examples, some or all of data ARS about environmental conditions can also, or instead, be provided as data AOC mentioned above with regards to block 610; e.g., information about the aircraft's configuration relates to the aircraft retrieval system(s), maximum and/or minimum aircraft acceleration, velocity, altitude, and/or speed information at the time of aircraft retrieval by the aircraft retrieval system(s).

At block 640, the computing device can map data AOC, EC, and/or ARS to a wind-over-vehicle envelope relative to vehicle orientation (course and/or speed). For example, the computing device can use method 500 to calculate values used in mapping AOC, EC, and/or ARS to the wind-over-vehicle envelope. In some examples, the computing device can use the maximum and/or minimum aircraft acceleration, velocity, altitude, and/or speed information at the time of aircraft retrieval by the aircraft retrieval system(s) in data ARS, the aircraft, aircraft operating limitations, and/or aircraft configuration information in data AOC, and the wind-over-vehicle data: in data EC to determine the wind-over-vehicle envelope.

In other examples, the computing device can use a loop to iterate over a range of possible vehicle-approach directions; e.g., a range of possible vehicle-approach directions from 0 degrees to 360 degrees. For each iteration of the loop involving a particular vehicle-approach direction of the range of possible vehicle-approach directions, the computing device can determine minimum and/or maximum wind-over-vehicle speeds that allow for retrieval of an aircraft approaching a vehicle at the particular vehicle-approach direction based on the data AOC, EC, and/or ARS. Then, the computing device can generate the wind-over-vehicle envelope as a graph of the minimum and/or maximum wind-over-vehicle speeds plotted at the particular vehicle-approach direction, thereby creating a graph of the wind-over-vehicle envelope that represents minimum and/or maximum wind-over-vehicle speeds over the range of possible vehicle-approach directions.

At block 650, the computing device can display mapped data using a user interface (UI), such as but not limited to a user interface related to aircraft and/or vehicle operations. A user interface related to aircraft and/or vehicle operations is also discussed herein at least in the context of FIGS. 7, 11, 12, and 13.

At block 660, the computing device can receive an input I from the user interface. The input I can be one or more of: an input for controlling and/or operating an aircraft, an input for controlling and/or operating a vehicle, an input related to updating and/or otherwise changing a display of the user interface, an input related to accepting or rejecting a recommendation provided by the user interface, an input related to exiting method 600, and/or another input.

At block 670, the computing device can determine whether input I relates to exiting method 600. For example, an input related to exiting method 600 can be generated by: pressing or otherwise selecting an Exit button or similar user interface control, pressing or otherwise selecting one or more keys, and/or providing a command related to exiting method 600. If the computing device determines that input I relates to exiting method 600, then the computing device can proceed to block 680. Otherwise, the computing device determines that input I does not relate to exiting method 600 and can proceed to block 690.

At block 680, the computing device can exit method 600.

At block 690, the computing device can update AOC, EC, and/or ARS based on input I and/or sensor data After completing the updates to AOC, EC, and/or ARS based on input I and/or sensor data, the computing device can proceed to block 640.

FIG. 7 is a flowchart of method 700, which is related to providing a wind-over-vehicle envelope using a user interface, according to an example embodiment. Method 700 is executable by a computing device, such as computing device 200 described above in the context of FIG. 2.

Method 700 begins at block 710, where the computing device can receive information related to $V_{W_oV}$, $\psi_{W_oV}$, $\gamma$, CAS, and ARS where:

$V_{W_oV}$ is a wind-over-vehicle speed of wind over a vehicle; e.g., wind speed as measured at the vehicle, $\psi_{W_oV}$ is a wind-over-vehicle angle or direction of the wind over the vehicle; e.g., wind angle or direction as measured at the vehicle, $\gamma$ is a designated approach angle of an aircraft to the vehicle, CAS is a commanded airspeed of the aircraft, and ARS includes data about aircraft retrieval system design limits.

Data ARS is discussed above in the context of at least block 630 of method 600. In some examples, at block 710, the computing device can receive additional information as well; e.g., some or all of data AOC and/or data EC discussed in the context of at least blocks 610 and 620 of method 600.

At block 720, the computing device can determine CrabMax, CrabMin, VrMax, and VrMin using the data about aircraft retrieval system design limits ARS, where CrabMax and CrabMin are respective maximum and minimum crab angles for the aircraft relative to the vehicle, and VrMax and VrMin are respective maximum and minimum speeds of the aircraft relative to the vehicle.

For example, the computing device can use the maximum and/or minimum aircraft acceleration, velocity, altitude, and/or speed information at the time of aircraft retrieval by the aircraft retrieval system(s) in data ARS to determine CrabMax, CrabMin, VrMax, and VrMin.

At block 730, the computing device can determine the relative speed of the aircraft with respect to the vehicle $V_r$ and/or the aircraft crab angle relative to the vehicle $\rho$. For example, the computing device can use method 500 to determine $V_r$ and/or $\rho$.

At block 740, the computing device can map a wind-over-vehicle envelope relative to vehicle orientation (i.e., vehicle orientation can include the vehicle direction and/or the vehicle speed) using $V_{W_oV}$, $\psi_{W_oV}$, $\gamma$, CAS, $V_r$, $\rho$, CrabMax, CrabMin, VrMax, and/or VrMin. The computing device can determine the wind-over-vehicle envelope using method 600, and then apply $V_{W_oV}$, $\psi_{W_oV}$, $\gamma$, CAS, $V_r$, $\rho$, CrabMax, CrabMin, VrMax, and/or VrMin to the wind-over-vehicle envelope to determine one or more recommendations RECS. The recommendation(s) RECS can include, but are not limited to, recommendations to maintain or change vehicle speed, controlling the aircraft ground speed of the aircraft and/or the aircraft ground direction of the aircraft; controlling the vehicle speed of the vehicle and/or the vehicle direction of the vehicle, maintaining a speed and/or a direction of the aircraft and/or the vehicle, changing a speed and/or a direction of the aircraft and/or the vehicle, recommendations related to vehicle direction, aircraft speed, and/or aircraft direction based on the wind-over-vehicle envelope, $V_{W_oV}$, $\psi_{W_oV}$, $\gamma$, CAS, $V_r$, $\rho$, CrabMax, CrabMin, VrMax, and/or VrMin. For example, RECS can include recommendations related to: controlling the aircraft and/or the vehicle to enable retrieval of the aircraft at the vehicle using an aircraft retrieval system described by data ARS, retrieving the aircraft using the aircraft retrieval system.

At block 750, the computing device can display WoV envelope and/or RECS using a user interface, such as but not limited to a user interface related to aircraft and/or vehicle operations. A user interface related to aircraft and/or vehicle operations is also discussed herein at least in the context of FIGS. 6, 11, 12, and 13.

In some examples, some or all of recommendations RECS can be associated with one or more commands that the computing device can send to the aircraft, vehicle, and/or the aircraft retrieval system to carry out the associated recommendations. For example, a recommendation R1 to change an aircraft ground speed, airspeed, ground direction, and/or air direction can be associated with one or more commands C1 to the aircraft to make the recommended change(s) in speed and/or direction. Then, a user of the user interface related to aircraft and/or vehicle operations can use the user interface to review recommendation R1 and indicate acceptance of the recommendation R1—upon the indication of the acceptance of recommendation R1, the computing device can send command(s) C1 to the aircraft to make the recommended change(s) in speed and/or direction. Other examples of recommendations and related commands are possible as well.

At block 760, the computing device can receive an input I from the user interface. Examples of input I are discussed above in the context of block 660 of method 600.

At block 770, the computing device can determine whether input I relates to exiting method 700. Example inputs related to exiting a method are described above in the context of block 670 of method 600. If the computing device determines that input I relates to exiting method 700, then the computing device can proceed to block 780. Otherwise, the computing device determines that input I does not relate to exiting method 700 and can proceed to block 790.

At block 780, the computing device can exit method 700.

At block 790, the computing device can update $V_{W_oV}$, $\psi_{W_oV}$, $\gamma$, CAS, and/or ARS based on input I and/or sensor data After completing the updates to $V_{W_oV}$, $\psi_{W_oV}$, $\gamma$, CAS, and/or ARS based on input I and/or sensor data, the computing device can proceed to block 740.

Figure 8:
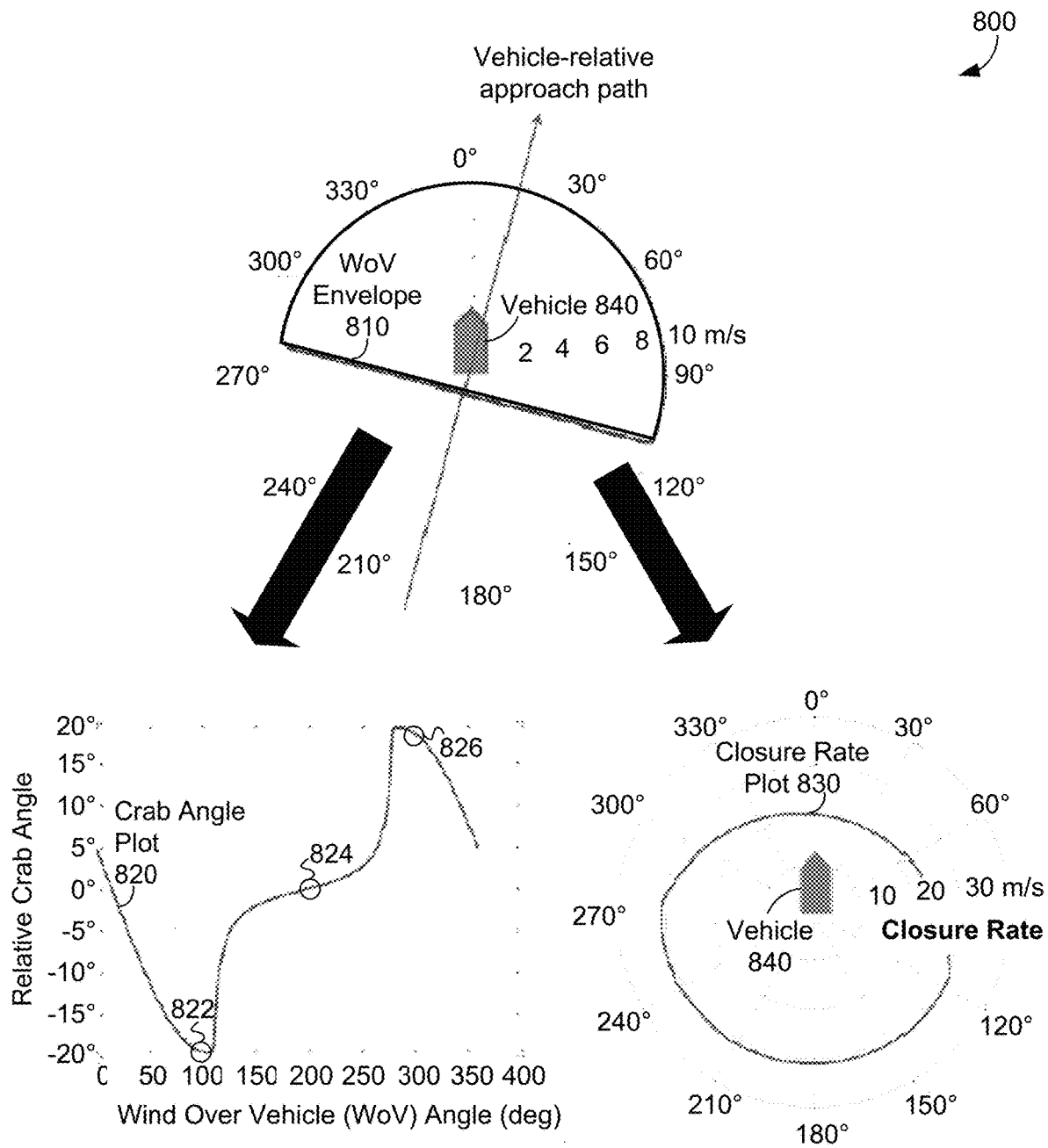
FIG. 8 shows a wind-over-vehicle envelope, a related crab angle plot, and a related closure rate plot, according to an example embodiment.

FIG. 8 illustrates diagram 800 showing wind-over-vehicle envelope 810 with related crab angle plot 820 and related closure rate plot 830, according to an example embodiment. Diagram 800 illustrates an example aircraft approach toward vehicle 840, where Table 2 summarizes conditions related to the example aircraft approach example and where Table 2 is partially reproduced in FIG. 8.

TABLE 2

| Symbol | Meaning | Example Value |
| --- | --- | --- |
| $V_V$ | Velocity of vehicle 840 | 5 meters per second in a direction shown as 0 degrees in FIG. 8 |
| WoV | Wind-over-vehicle for vehicle 840 | 10 meters per second maximum with a 1 meter per second tail wind limit; wind- over-vehicle direction as indicated. |
| $V_a$ | Air velocity of an aircraft approaching vehicle 840 | Aircraft air speed is 30 meters per second; aircraft air direction unspecified |
|  | No crab angle limits | None. |
|  | No closure rate limits | None. |

Diagram 800 illustrates that wind-over-vehicle envelope 810 indicates relationships between a direction of a vehicle-relative approach path with respect to vehicle 840 measured in degrees and a wind-over-vehicle speed measured in meters per second. Wind-over-vehicle envelope 810 indicates maxima and minima of wind-over-vehicle speed at a given vehicle-relative approach path direction for an aircraft approaching vehicle 840 that allows for successful retrieval of the aircraft. For example, suppose an aircraft is approaching vehicle 840 using an approach path having vehicle-relative approach path direction of approximately 15 degrees—this approach path is illustrated at an upper portion of FIG. 8 using an arrow passing through both vehicle 840 and wind-over-vehicle envelope 810. Then, wind-over-vehicle envelope 810 illustrates that a minimum wind-over-vehicle speed allowing successful retrieval of the aircraft at the approximately 15 degree approach path is 0 meters per second and a maximum wind-over-vehicle speed allowing successful retrieval of the aircraft at the approximately 15 degree approach path is approximately 9 meters per second.

FIG. 8 shows crab angle plot 820 and closure rate plot 830 for the example mentioned above with respect to Table 2. Crab angle plot 820, shown at lower left of FIG. 8, shows relative crab angles for the aircraft approaching vehicle 840 with respect to possible wind-over-vehicle directions. As examples, circles 822, 824, 826 of crab angle plot show respective relative crab angles of approximately −20 degrees, approximately 0 degrees, and approximately +19 degrees, for an aircraft approaching vehicle 840 with at respective wind-over-vehicle directions of approximately 100 degrees, approximately 200 degrees, and approximately 300 degrees.

Closure rate plot 830, shown at lower right of FIG. 8, shows closure rates, or rates of approach of an aircraft toward vehicle 840, with respect to wind-over-vehicle directions. For example, for a wind-over-vehicle direction of 0 degrees in the example mentioned above with respect to Table 2, closure rate plot 830 indicates that the aircraft will have a closure rate with vehicle 840 of approximately 18 meters per second. As another example, for a wind-over-vehicle direction of 195 degrees in the example mentioned above with respect to Table 2, closure rate plot 830 indicates that the aircraft will have a closure rate with vehicle 840 of approximately 31 meters per second.

Figure 9:
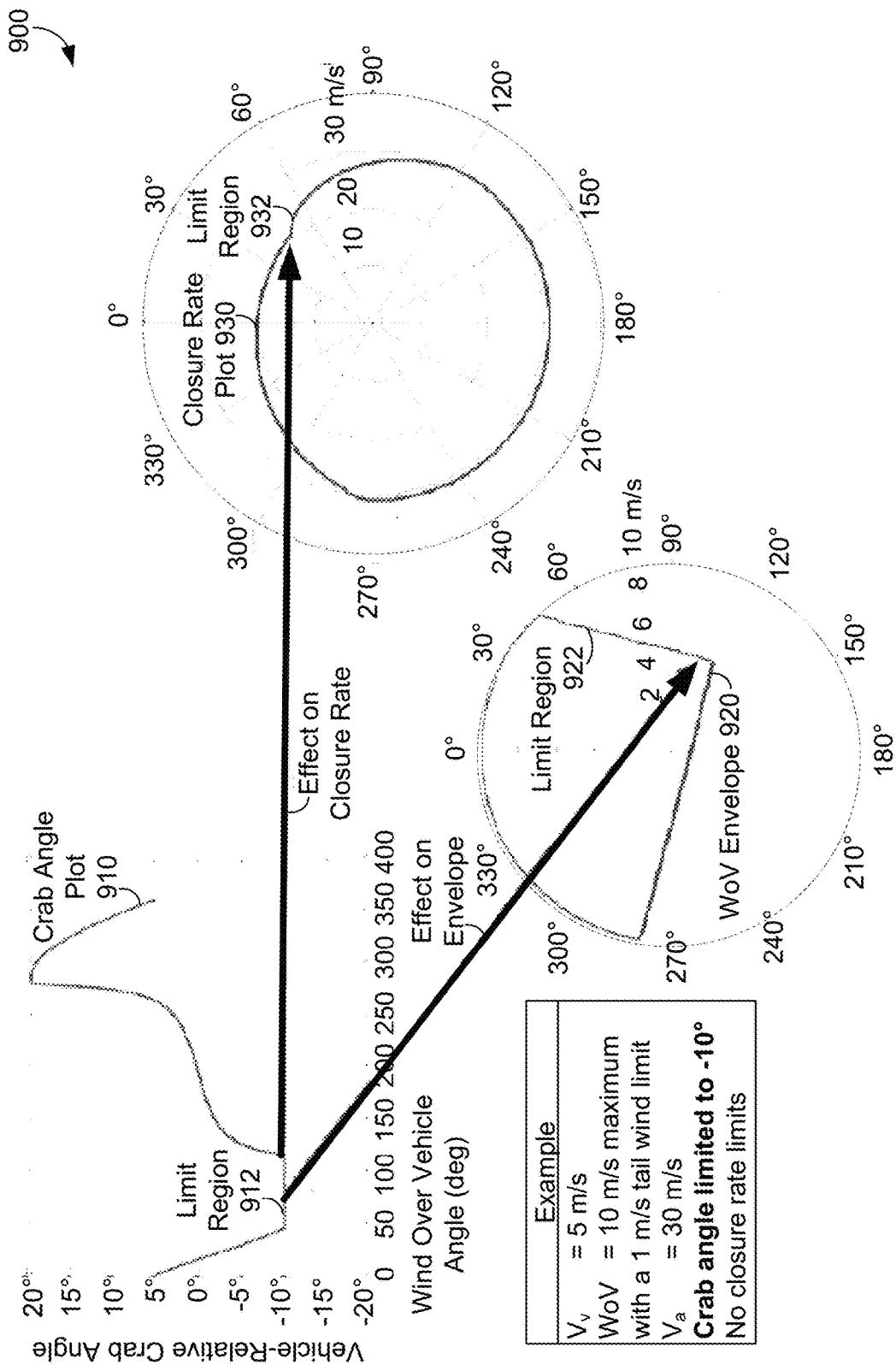
FIG. 9 shows a crab angle plot, a related wind-over-vehicle envelope, and a related closure rate plot, according to an example embodiment.

FIG. 9 illustrates diagram 900 showing crab angle plot 910, related wind-over-vehicle envelope 920, and related closure rate plot 930, according to an example embodiment. Diagram 900 illustrates an example aircraft approach toward vehicle 840, where Table 3 summarizes conditions related to the example aircraft approach example and is partially reproduced in FIG. 9.

TABLE 3

| Symbol | Meaning | Example Value |
| --- | --- | --- |
| $V_V$ | Velocity of vehicle 840 | 5 meters per second in a direction shown as 0 degrees in FIG. 9 |
| WoV | Wind-over-vehicle for vehicle 840 | 10 meters per second maximum with a 1 meter per second tail wind limit; wind- over-vehicle direction as indicated |
| $V_a$ | Air velocity of an aircraft approaching vehicle 840 | Aircraft air speed is 30 meters per second; aircraft air direction unspecified |
|  | A minimum crab angle is limited to −10 degrees | None. |
|  | No closure rate limits | None. |

The example aircraft approach summarized in Table 3 and shown in FIG. 9 is similar to the example aircraft approach summarized in Table 2 and shown in FIG. 8. The difference between the two example aircraft approaches is that the example aircraft approach illustrated by Table 2 and FIG. 8 has no limits on crab angles, where the example aircraft approach illustrated by Table 3 and FIG. 9 has a crab angle limit where a minimum crab angle is limited to −10 degrees.

As can be seen at upper left of FIG. 9, crab angle plot 910 graphically illustrates the crab angle limit where the minimum crab angle is limited to −10 degrees, most notably in limit region 912. In comparison to crab angle plot 820 of FIG. 8 that depicts a minimum crab angle of approximately −20 degrees; e.g., at a wind-over-vehicle angle of approximately 100 degrees, crab angle plot 910 of FIG. 9 shows a minimum crab angle of approximately −10 degrees; e.g., as shown throughout limit region 912.

FIG. 9 also shows that limiting the minimum crab angle to −10 degrees has a visible effect not only on crab angle plot 910, but also has visible effects on wind-over-vehicle envelope 920 and closure rate plot 930. FIG. 9 shows, at lower center, wind-over-vehicle envelope 920 with limit region 922 indicating a truncated wind-over-vehicle envelope 920 for an approximate range of wind-over-vehicle directions of 45 degrees to 105 degrees in comparison to wind-over-vehicle envelope 810 of FIG. 8. That is, wind-over-vehicle envelope 810 shows larger maxima of wind-over-vehicle speeds for vehicle-relative approach path directions between approximately 45 degrees and 105 degrees in comparison to maxima illustrated in limit region 922 of wind-over-vehicle envelope 920. As such, a comparison of wind-over-vehicle envelope 810 and wind-over-vehicle envelope 920 illustrates the crab angle limit imposed for the example illustrated by Table 3 and FIG. 9, imposes a corresponding limit on wind-over-vehicle speeds over a range of vehicle-relative approach path directions.

FIG. 9 also shows, at upper right, closure rate plot 930 with limit region 932 indicating a region where a closure rate of an aircraft approaching vehicle 940 has been reduced due to the crab angle limit imposed for the example. More particularly, limit region 932 of closure rate plot 930 shows a closure rate throughout limit region 932 of approximately 18 meters per second, while a closure rate of a corresponding region of closure rate plot 830 increases from approximately 18 meters per second to approximately 20 meters per second as wind-over-vehicle directions ranges from approximately 15 degrees to approximately 45 degrees.

Figure 10:
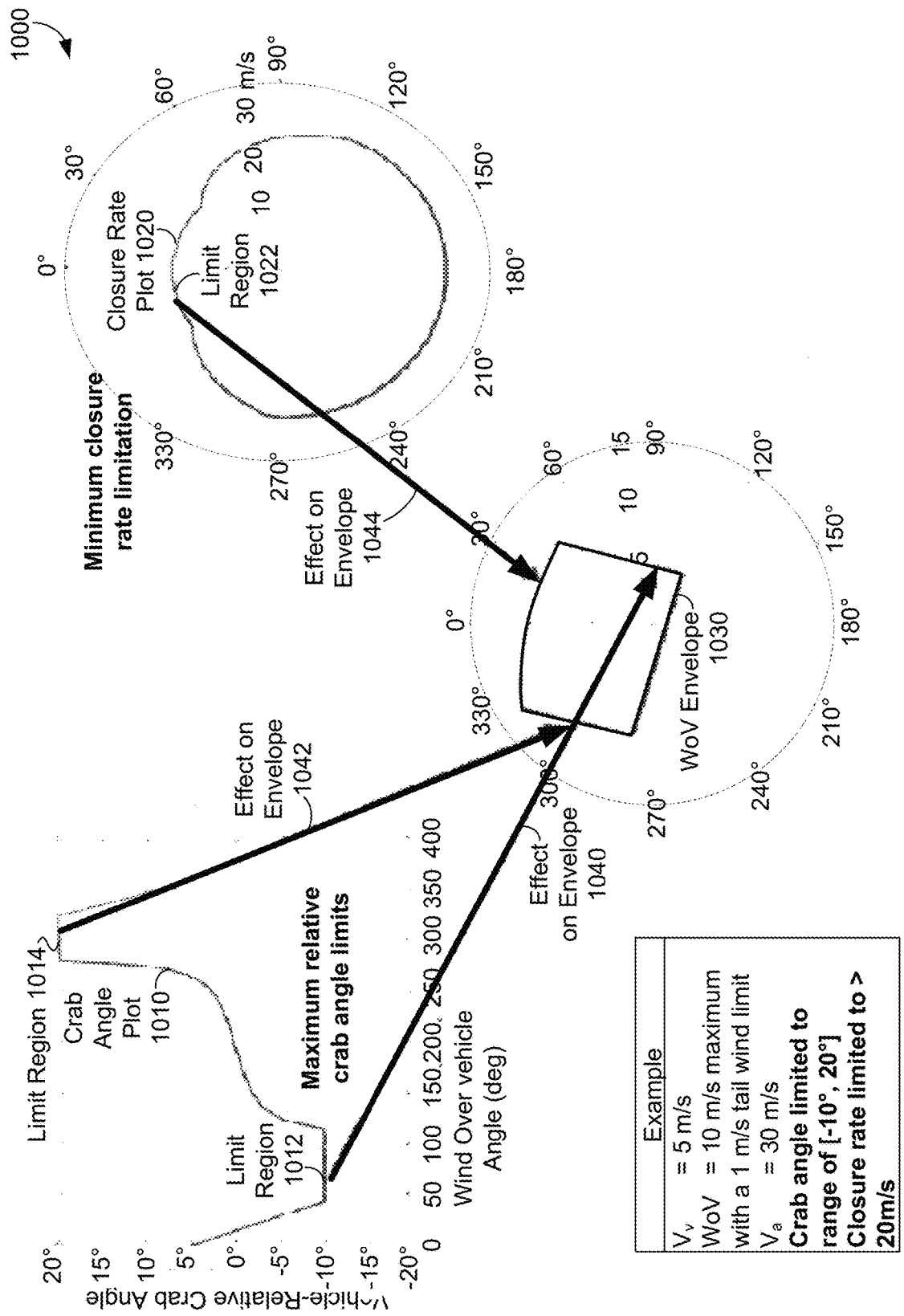
FIG. 10 shows another crab angle plot, a related wind-over-vehicle envelope, and a related closure rate plot, according to an example embodiment.

FIG. 10 illustrates diagram 1000 showing crab angle plot 1010, related closure rate plot 1020, and related wind-over-vehicle envelope 1030, according to an example embodiment. Diagram 1000 illustrates an example aircraft approach toward vehicle 840, where Table 4 summarizes conditions related to the example aircraft approach example and is partially reproduced in FIG. 10.

TABLE 4

| Symbol | Meaning | Example Value |
|---|---|---|
| $V_V$ | Velocity of vehicle 840 | 5 meters per second in a direction shown as 0 degrees in FIG. 10 |
| WoV | Wind-over-vehicle for vehicle 840 | 10 meters per second maximum with a 1 meter per second tail wind limit; wind-over-vehicle direction as indicated. |
| $V_a$ | Air velocity of an aircraft approaching vehicle 840 | Aircraft air speed is 30 meters per second; aircraft air direction unspecified |
| | A minimum crab angle is limited to −10 degrees and a maximum crab angle is limited to +20 degrees. | None. |
| | A minimum closure rate is limited to 20 meters per second. | None. |

The example aircraft approach summarized in Table 4 and shown in FIG. 10 is similar to the example aircraft approach summarized in Table 3 and shown in FIG. 9. The difference between the example aircraft approach illustrated by Table 3 and FIG. 9 has a crab angle limit where a minimum crab angle is limited to −10 degrees and no limits on closure rates, while the example aircraft approach illustrated by Table 4 and FIG. 10 has limits on both the minimum crab angle (limited to −10 degrees) and a maximum crab angle limit of +20 degrees, and has a minimum closure rate limit of 20 meters per second.

As can be seen at upper left of FIG. 10, crab angle plot 1010 graphically illustrates crab angle limits where the minimum crab angle is limited to −10 degrees, notably in limit region 1012 and where the maximum crab angle is limited to +20 degrees, notably in limit region 1014. In comparison to crab angle plot 820 of FIG. 8 that depicts a minimum crab angle of approximately −20 degrees; e.g., at a wind-over-vehicle angle of approximately 100 degrees, crab angle plot 1010 of FIG. 10 shows a minimum crab angle of approximately −10 degrees; e.g., as shown throughout limit region 1012. This minimum crab angle limit also leads to effect on envelope 1040 that truncates wind-over-vehicle envelope 1030 for an approximate range of vehicle-relative approach path directions of 45 degrees to 105 degrees in comparison to wind-over-vehicle envelope 810 of FIG. 8, where wind-over-vehicle envelope 1030 is shown at lower center of FIG. 10.

Also, in comparison to crab angle plot 820 of FIG. 8 that depicts a maximum crab angle of approximately +21 degrees; e.g., at a wind-over-vehicle angle of approximately 295 degrees, crab angle plot 1010 of FIG. 10 shows a maximum crab angle of approximately +20 degrees; e.g., as shown throughout limit region 1014. This maximum crab angle limit also leads to effect on envelope 1042 that truncates wind-over-vehicle envelope 1030 for an approximate range of vehicle-relative approach path directions of 280 degrees to 320 degrees in comparison to wind-over-vehicle envelope 810 of FIG. 8.

FIG. 10 shows that the minimum closure rate limit of 20 meters has an effect both closure rate plot 1020 and wind-over-vehicle envelope 1030. As shown at upper right of FIG. 10, closure rate plot 1020 includes limit region 1022 where the closure rate is shown as being at least 20 meters per second throughout a range of wind-over-vehicle directions between approximately 320 degrees to approximately 45 degrees. The minimum closure rate limit of 20 meters also has effect 1044 on wind-over-vehicle envelope 1030 of reducing a maximum wind-over-vehicle speed throughout the range of vehicle-relative approach path directions between approximately 320 degrees to approximately 45 degrees from the approximately 10 meters per second shown throughout the range of vehicle-relative approach path directions between approximately 320 degrees to approximately 45 degrees shown in wind-over-vehicle envelope 810 of FIG. 8.

FIGS. 11, 12, and 13 illustrate scenario 1100 utilizing user interface 1110 related to aircraft and/or vehicle operations, according to an example embodiment. Scenario 1100 begins with a computing device providing user interface 1110 to display a wind-over-vehicle envelope for retrieving an aircraft at a vehicle and recommendations related to controlling the vehicle to enable a safe retrieval of the aircraft. Scenario 1100 continues with the recommendations being accepted and user interface 1110 updating the display of the wind-over-vehicle envelope being updated to indicate that the aircraft's approach to the vehicle is within the wind-over-vehicle envelope and therefore represents a safe approach to the vehicle for aircraft retrieval. Scenario 1100 continues with a control of user interface 1110 being selected to change display of the wind-over-vehicle envelope to a display of a closure rate plot for the aircraft. Along with the display of the closure rate plot, user interface 1110 displays recommendations to change the airspeed and air direction of the aircraft. The recommendations to change the airspeed and air direction of the aircraft are accepted and scenario 1100 ends.

FIG. 11 shows that scenario 1100 begins with a computing device providing user interface 1110. User interface 1110 includes display region 1112 and current vehicle/wind/aircraft data region 1140. FIG. 11 shows that display region 1112 includes graph 1120, display closure rate plot control 1124, and display crab angle plot control 1126. Graph 1120 includes wind-over-vehicle envelope 1122, current position 1130 illustrated using a black star, and recommended position 1132 illustrated using a white star. Wind-over-vehicle envelope 1122 shows ranges of wind-over-vehicle speeds that allow for safe retrieval of the aircraft at the vehicle using the aircraft retrieval system plotted with respect to a range of wind-over-vehicle directions represented in graph 1122 as 0 degrees to 360 degrees. Current position 1130 illustrates how prevailing conditions for the aircraft, the vehicle, and the wind relate to wind-over-vehicle envelope 1122.

FIG. 11 shows that current position 1130 is outside of wind-over-vehicle envelope 1122 and therefore retrieval of the aircraft under the prevailing conditions may not be successful and/or safe. Graph 1120 also includes recommended position 1132 inside wind-over-vehicle envelope 1122, where recommended position 1132 indicates a set of conditions for the aircraft, the vehicle, and the wind where retrieval of the aircraft is likely to be safe and successful.

Display closure rate plot control 1124, when selected (e.g., by a user of user interface 1110), instructs user interface 1110 to display a closure rate plot, such as a closure rate plot discussed above at least in the context of FIGS. 8, 9, and 10. Display crab angle plot control 1126, when selected, instructs user interface 1110 to display a crab angle plot, such as a crab angle plot discussed above at least in the context of FIGS. 8, 9, and 10.

Current vehicle/wind/aircraft data region 1140 includes data about the prevailing conditions for the aircraft, the vehicle, and the wind, indicator 1142, and recommendation 1144. FIG. 11 shows that current vehicle/wind/aircraft data region 1140 indicates the prevailing conditions include a "Vehicle Speed/Direction" having a vehicle speed of "20" knots per hour (KPH) and a vehicle direction of "5°"; a "WoV Speed/Direction" indicating a wind-over-vehicle speed of "22 KPH" and a wind-over-vehicle direction of "305°"; an "Aircraft Airspeed" of "30 KPH"; an "Aircraft to Vehicle Closure Rate" of "21 KPH"; and an "Approach Angle" for the aircraft of "15° relative to vehicle".

Current vehicle/wind/aircraft data region 1140 includes data about any limitations imposed upon the prevailing conditions; e.g., limitations due to a mission, limitations due to procedures/policy such as aircraft speed limits and allowed or restricted approaches to a vehicle. Examples of limitations imposed upon the prevailing conditions include, but are not limited to limitations on crab angles and closure rates discussed above at least in the context of FIGS. 8, 9, and 10. In scenario 1100 and as shown in FIG. 11, the data about any limitations imposed upon the prevailing conditions includes indications that "[n]o limitations" are placed on either "crab angles" or "closure rates".

Current vehicle/wind/aircraft data region 1140 also includes indicator 1142 that provides an indication that the prevailing conditions are "OUTSIDE OF" the wind-over-vehicle "ENVELOPE" and so "LANDING" is "NOT RECOMMENDED". Recommendations 1144 provide recommendations and/or more detail about the indication displayed by indicator 1142—FIG. 11 shows that recommendations 1144 indicate a "request" that the "vehicle course change about 30° into the wind and/or" that the "vehicle" is to "slowdown". Recommendations 1144 also reiterate the indication of indicator 1142 that "[l]anding of aircraft using aircraft retrieval system NOT recommended".

Recommendations 1144 also include accept recommendation for vehicle control 1150, which if selected, directs the computing device to generate and send a command to the vehicle to accept recommendations 1144; that is, the command sent to the vehicle can include a command to the vehicle to change course about 30 degrees into the wind and/or to slow down the vehicle. In scenario 1100, accept recommendation for vehicle control 1150 is selected, which causes the computing device to send a command to the vehicle to change course about 30 degrees into the wind. The vehicle receives the command and subsequently changes course about 30 degrees into the wind. After the vehicle changes course about 30 degrees into the wind, scenario 1100 continues with the computing device updating the display of user interface 1110 to the display illustrated by FIG. 12.

FIG. 12 shows that display region 1112 of user interface 1110 includes graph 1210, display closure rate plot control 1124, and display crab angle plot control 1126. Graph 1120 includes wind-over-vehicle envelope 1122, and current position 1220 illustrated using a black star. Wind-over-vehicle envelope 1122, display closure rate plot control 1124, and display crab angle plot control 1126 are discussed above in more detail at least in the context of FIG. 11 Current position 1220 illustrates how prevailing conditions for the aircraft, the vehicle, and the wind at a time graph 1210 is displayed relate to wind-over-vehicle envelope 1122. FIG. 12 shows that current position 1220 is inside of wind-over-vehicle envelope 1122 and therefore retrieval of the aircraft under the prevailing conditions is likely to be successful and/or safe.

Current vehicle/wind/aircraft data region 1140 includes data about the prevailing conditions for the aircraft, the vehicle, and the wind, indicator 1232, and recommendation 1234. FIG. 12 shows that current vehicle/wind/aircraft data region 1140 indicates the prevailing conditions include a "Vehicle Speed/Direction" having a vehicle speed of "15 KPH" and a vehicle direction of "340°"; a "WoV Speed/Direction" indicating a wind-over-vehicle speed of "20 KPH" and a wind-over-vehicle direction of "330°"; an "Aircraft Airspeed" of "30 KPH"; an "Aircraft to Vehicle Closure Rate" of "26 KPH"; and an "Approach Angle" for the aircraft of "15° relative to vehicle".

Current vehicle/wind/aircraft data region 1140 includes data about any limitations imposed upon the prevailing conditions; as shown in FIG. 12, the data about any limitations imposed upon the prevailing conditions includes indications that "[n]o limitations" are placed on either "crab angles" or "closure rates". Current vehicle/wind/aircraft data region 1140 also includes indicator 1232 that provides an indication that the prevailing conditions are "INSIDE" the wind-over-vehicle "ENVELOPE". Recommendations 1234 provide recommendations and/or more detail about the indication displayed by indicator 1232—FIG. 12 shows that recommendations 1234 include a recommendation to "[m]aintain current heading and speed for both aircraft and vehicle" and that it is "OK"; i.e., likely safe "to land aircraft using aircraft retrieval system."

Scenario 1100 continues with display closure rate plot control 1124 of user interface 1110 being selected. After display closure rate plot control 1124 is selected, the computing device determines a closure rate plot and changes a display in display region 1112 from displaying graph 1210 with wind-over-vehicle envelope to a display of a closure-rate plot.

FIG. 13 shows user interface 1110 of scenario 1100 after the computing device has changed display region 1112 to display closure rate plot 1312. Display region 1112 of user interface 1110 includes closure rate plot 1312, display wind-over-vehicle envelope control 1314, and display crab angle plot control 1126. Closure rate plot 1312, which is plotted on graph 1310, depicts of closure rates between the vehicle and the aircraft of scenario over a range of wind-over-vehicle directions. The indications of vehicle 1350 and aircraft 1360 in graph 1310 illustrate how prevailing conditions for the vehicle and the aircraft relate to closure rate plot 1312. In particular, closure rate plot 1312 shows aircraft 1360 approaching vehicle 1350 at a vehicle-relative approach path direction of approximately 195 degrees and a closure rate of approximately 26 KPH. Closure rate plot 1312 also includes vector 1362 from a current position of aircraft 1360 with respect to graph 1310 to recommended position 1364 with respect to graph 1310, where recommended position 1364 corresponds to a wind-over-vehicle direction of approximately 195 degrees and a closure rate of approximately 18 KPH.

Display crab angle plot control 1126 is discussed above in more detail at least in the context of FIG. 11. Display wind-over-vehicle envelope control 1314 replaced display crab angle plot control 1126 after closure rate plot 1312 was displayed by user interface 1110, as a wind-over-vehicle envelope was no longer being displayed. Display wind-over-vehicle envelope control 1314, when selected, instructs user interface 1110 to display a graph with a wind-over-vehicle envelope, such discussed above at least in the context of FIGS. 8-12.

Current vehicle/wind/aircraft data region 1140 includes data about the prevailing conditions for the aircraft, the vehicle, and the wind, indicator 1332, and recommendation 1334. FIG. 11 shows that current vehicle/wind/aircraft data region 1140 indicates the prevailing conditions include a "Vehicle Speed/Direction" having a vehicle speed of "10 KPH" and a vehicle direction of "340°"; a "WoV Speed/Direction" indicating a wind-over-vehicle speed of "3 KPH" and a wind-over-vehicle direction of "200°"; an "Aircraft Airspeed" of "23 KPH"; an "Aircraft to Vehicle Closure Rate" of "26 KPH"; and an "Approach Angle" for the aircraft of "15° relative to vehicle". Current vehicle/wind/aircraft data region 1140 includes data about any limitations imposed upon the prevailing conditions; as shown in FIG. 13, the data about any limitations imposed upon the prevailing conditions includes indications that "[n]o limitations" are placed on either "crab angles" or "closure rates".

Current vehicle/wind/aircraft data region 1140 also includes indicator 1332 that provides an indication that the prevailing conditions indicate the aircraft is "Exceeding Closure Rate". Recommendations 1334 provide recommendations and/or more detail about the indication displayed by indicator 1332—FIG. 13 shows that recommendations 1334 include a recommendation to "Change airspeed and/or aircraft heading to align velocity relative to vehicle with vector 1362".

Recommendations 1334 also include accept recommendation for aircraft control 1370, which if selected, directs the computing device to generate and send a command to the vehicle to accept recommendations 1334; that is, the command sent to the aircraft can include a command to the aircraft to approach the vehicle so that a resulting wind-over-vehicle direction is approximately 195 degrees and a closure rate is approximately 18 KPH. In scenario 1100, accept recommendation for aircraft control 1370 is selected, which causes the computing device to send a command to the aircraft to change its approach the vehicle to a vehicle-relative approach path direction of approximately 195 degrees and a closure rate of approximately 18 KPH. The aircraft receives the command and subsequently changes course to approach the vehicle so that a wind-over-vehicle direction is approximately 195 degrees and a closure rate of the aircraft is approximately 18 KPH. After the aircraft changes its course as indicated above, scenario 1100 ends.

In related scenarios, the aircraft is retrieved at the vehicle following guidance and commands provided from the computing device (in response to selections of user interface 1110) to the vehicle and/or the aircraft. In some of these related scenarios, the aircraft is retrieved at the vehicle using an aircraft retrieval system; e.g., aircraft retrieval system 330; aircraft retrieval system 340.

The novel features believed characteristic of the illustrative embodiments are set forth in the appended claims. The illustrative embodiments, however, as well as a preferred mode of use, further objectives and descriptions thereof, will best be understood by reference to the present specification when read in conjunction with the accompanying drawings in which some, but not all of the disclosed embodiments may be shown.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling an aircraft and/or a vehicle to enable retrieval of the aircraft at the vehicle, the method comprising:

receiving a vehicle speed of the vehicle and a vehicle direction of the vehicle;

measuring a wind-over-vehicle speed of wind at the vehicle and a wind-over-vehicle direction of wind at the vehicle;

receiving an aircraft ground speed of the aircraft and an aircraft ground direction of the aircraft;

calculating an aircraft-relative-to-vehicle speed and an aircraft-relative-to-vehicle direction based on the aircraft ground speed, the aircraft ground direction, the wind-over-vehicle speed, and the wind-over-vehicle direction;

accounting for one or more aircraft retrieval system design limits related to retrieving the aircraft at the vehicle, wherein the one or more aircraft retrieval system is located on the vehicle, wherein the one or more aircraft retrieval system design limits include information about a mechanical configuration of the one or more aircraft retrieval systems;

calculating a wind-over-vehicle envelope based on the one or more aircraft retrieval system design limits, the wind-over-vehicle envelope mapping maximum and minimum limits of wind-over-vehicle speeds over a range of aircraft-relative-to-vehicle approach path directions for the aircraft approaching the vehicle that enable retrieval of the aircraft at the vehicle; and controlling the aircraft and/or the vehicle to enable retrieval of the aircraft at the vehicle using the wind-over-vehicle envelope, the aircraft-relative-to-vehicle speed, and the aircraft-relative-to-vehicle direction.

2. The method of claim 1, wherein controlling the aircraft and/or the vehicle to enable retrieval of the aircraft at the vehicle comprises controlling the aircraft and/or the vehicle to enable retrieval of the aircraft at the vehicle using the aircraft retrieval system.

3. The method of claim 2, wherein controlling the aircraft and/or the vehicle to enable retrieval of the aircraft at the vehicle using the aircraft retrieval system comprises:

directing the aircraft to fly towards the aircraft-relative-to-vehicle direction and near the aircraft-relative-to-vehicle speed until reaching the vehicle; and when the aircraft reaches the vehicle, retrieving the aircraft using the aircraft retrieval system.

4. The method of claim 3, wherein the aircraft retrieval system comprises an elongated member and/or a net, and wherein retrieving the aircraft using the aircraft retrieval system comprises retrieving the aircraft using the elongated member and/or the net of the aircraft retrieval system.

5. The method of claim 4, wherein the aircraft comprises a hook, and wherein retrieving the aircraft using the elongated member and/or the net of the aircraft retrieval system comprises retrieving the aircraft using the elongated member and/or the net of the aircraft retrieval system and the hook.

6. The method of claim 1, wherein controlling the aircraft and/or the vehicle to enable retrieval of the aircraft at the vehicle comprises:

controlling the aircraft ground speed of the aircraft and/or the aircraft ground direction of the aircraft; and/or controlling the vehicle speed of the vehicle and/or the vehicle direction of the vehicle.

7. The method of claim 1, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the aircraft-relative-to-vehicle speed and the aircraft-relative-to-vehicle direction of the aircraft.

8. The method of claim 1, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum wind-over-vehicle speed, providing a command to the aircraft that changes the aircraft-relative-to-vehicle speed of the aircraft and/or the aircraft-relative-to-vehicle direction of the aircraft.

9. The method of claim 1, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the vehicle speed and the vehicle direction of the vehicle.

10. The method of claim 1, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum wind-over-vehicle speed, changing the vehicle speed of the vehicle and the vehicle direction of the vehicle.

11. The method of claim 1, further comprising:

providing an output of a computing device, the output comprising one or more of: an image of the wind-over-vehicle envelope, an image of a crab angle plot of crab angles and wind-over-vehicle directions, or an image of a closure rate plot of a closure rate between the aircraft and the vehicle.

12. The method of claim 1, further comprising:
utilizing the vehicle on a body of water.

13. The method of claim 1, further comprising:
utilizing the vehicle on a road.

14. A computing device, comprising:
one or more processors; and
one or more non-transitory computer-readable media configured to store at least computer-readable instructions that, when executed by the one or more processors, causes the computing device to perform functions comprising:

receiving a vehicle speed of a vehicle and a vehicle direction of the vehicle;

measuring a wind-over-vehicle speed of wind at the vehicle and a wind-over-vehicle direction of wind at the vehicle;

receiving an aircraft ground speed of an aircraft and an aircraft ground direction of the aircraft;

calculating an aircraft-relative-to-vehicle speed and an aircraft-relative-to-vehicle direction based on the aircraft ground speed, the aircraft ground direction, the wind-over-vehicle speed, and the wind-over-vehicle direction;

accounting for one or more aircraft retrieval system design limits related to retrieving the aircraft at the vehicle, wherein the one or more aircraft retrieval system is located on the vehicle, wherein the one or more aircraft retrieval system design limits include information about a mechanical configuration of the one or more aircraft retrieval systems;

calculating a wind-over-vehicle envelope based on the one or more aircraft retrieval system design limits, the wind-over-vehicle envelope mapping maximum and minimum limits of wind-over-vehicle speeds over a range of aircraft-relative-to-vehicle approach path directions for the aircraft approaching the vehicle that enable retrieval of the aircraft at the vehicle; and controlling the aircraft and/or the vehicle to enable retrieval of the aircraft at the vehicle using the wind-over-vehicle envelope, the aircraft-relative-to-vehicle speed, and the aircraft-relative-to-vehicle direction.

15. The computing device of claim 14, wherein controlling the aircraft and/or the vehicle to enable retrieval of the aircraft at the vehicle comprises:

directing the aircraft to fly towards the aircraft-relative-to-vehicle direction and near the aircraft-relative-to-vehicle speed until reaching the vehicle; and when the aircraft reaches the vehicle, retrieving the aircraft using the aircraft retrieval system.

16. The computing device of claim 14, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the aircraft-relative-to-vehicle speed and the aircraft-relative-to-vehicle direction of the aircraft.

17. The computing device of claim 14, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum wind-over-vehicle speed, providing a command to the aircraft that changes the aircraft-relative-to-vehicle speed of the aircraft and/or the aircraft-relative-to-vehicle direction of the aircraft.

18. The computing device of claim 14, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is between the minimum wind-over-vehicle speed and the maximum wind-over-vehicle speed; and after determining that the wind-over-vehicle speed is between the minimum wind-over-vehicle speed and the maximum wind-over-vehicle speed, maintaining the vehicle speed and the vehicle direction of the vehicle.

19. The computing device of claim 14, wherein controlling the aircraft and/or the vehicle to enable retrieval of the aircraft at the vehicle comprises:

determining a minimum wind-over-vehicle speed and a maximum wind-over-vehicle speed at the aircraft-relative-to-vehicle direction using the wind-over-vehicle envelope;

determining whether the wind-over-vehicle speed is not between the minimum wind-over-vehicle speed and the maximum wind-over-vehicle speed; and after determining that the wind-over-vehicle speed is not between the minimum wind-over-vehicle speed and the maximum wind-over-vehicle speed, changing the vehicle speed of the vehicle and the vehicle direction of the vehicle.

20. A non-transitory computer readable medium having stored thereon computer-readable instructions, that when executed by one or more processors of a computing device, cause the computing device to perform functions comprising:

receiving a vehicle speed of a vehicle and a vehicle direction of the vehicle;

measuring a wind-over-vehicle speed of wind at the vehicle and a wind-over-vehicle direction of wind at the vehicle;

receiving an aircraft ground speed of an aircraft and an aircraft ground direction of the aircraft;

calculating an aircraft-relative-to-vehicle speed and an aircraft-relative-to-vehicle direction based on the aircraft ground speed, the aircraft ground direction, the wind-over-vehicle speed, and the wind-over-vehicle direction;

accounting for one or more aircraft retrieval system design limits related to retrieving the aircraft at the vehicle, wherein the one or more aircraft retrieval system is located on the vehicle, wherein the one or more aircraft retrieval system design limits include information about a mechanical configuration of the one or more aircraft retrieval systems;

calculating a wind-over-vehicle envelope based on the one or more aircraft retrieval system design limits, the wind-over-vehicle envelope mapping maximum and minimum limits of wind-over-vehicle speeds over a range of aircraft-relative-to-vehicle approach path directions for the aircraft approaching the vehicle that enable retrieval of the aircraft at the vehicle; and controlling the aircraft and/or the vehicle to enable retrieval of the aircraft at the vehicle using the wind-over-vehicle envelope, the aircraft-relative-to-vehicle speed, and the aircraft-relative-to-vehicle direction.

* * * * *